US012646829B2

(12) United States Patent
Cho et al.

(10) Patent No.: US 12,646,829 B2
(45) Date of Patent: Jun. 2, 2026

(54) ELECTRONIC DEVICE COMPRISING ANTENNA

(71) Applicant: SAMSUNG ELECTRONICS CO., LTD., Suwon-si (KR)

(72) Inventors: Youngjun Cho, Suwon-si (KR); Seunghwan Kim, Suwon-si (KR); Jaebong Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 18/628,158

(22) Filed: Apr. 5, 2024

(65) Prior Publication Data

US 2024/0250418 A1 Jul. 25, 2024

Related U.S. Application Data

(63) Continuation of application No. PCT/KR2022/011564, filed on Aug. 4, 2022.

(30) Foreign Application Priority Data

Oct. 7, 2021 (KR) ........................ 10-2021-0133368

(51) Int. Cl.
*H01Q 1/24* (2006.01)
*H01Q 1/46* (2006.01)
(Continued)

(52) U.S. Cl.
CPC ............... *H01Q 1/46* (2013.01); *H01Q 1/243* (2013.01); *H01Q 5/335* (2015.01); *H04R 1/025* (2013.01);
(Continued)

(58) Field of Classification Search
CPC H01Q 1/46; H01Q 1/00; H01Q 1/243; H01Q 5/335; H01Q 5/321; H01Q 5/371;
(Continued)

(56) References Cited

U.S. PATENT DOCUMENTS 9,948,342 B2 4/2018 Shi et al.
2005/0024273 A1 * 2/2005 Hayes ..................... H04M 1/03 343/702
(Continued)

FOREIGN PATENT DOCUMENTS

JP 2004-364045 A 12/2004
KR 10-2016-0143128 A 12/2016
(Continued)

OTHER PUBLICATIONS

Communication dated Dec. 12, 2024, issued by European Patent Office in European Patent Application No. 22878694.3.
(Continued)

*Primary Examiner* — David E Lotter
(74) *Attorney, Agent, or Firm* — Sughrue Mion, PLLC

(57) ABSTRACT

An electronic device includes a first frame, a speaker module, a wireless communication circuit, a conductive connection member which is connected to the wireless communication circuit via a first capacitor, a conductive pattern which is connected at a first point to the conductive connection member, and includes a first portion extending from the first point and connected to the speaker module and a second portion extending from the first point, and a control circuit, wherein the first portion includes a first inductor, and the wireless communication circuit may transmit or receive a first signal in a first frequency band via a first electrical path including the first capacitor, the conductive connection member, and the second portion of the conductive pattern.

20 Claims, 18 Drawing Sheets

<B-B' CROSS-SECTIONAL VIEW>

(51) Int. Cl.

| | |
|---|---|
| ***H01Q 5/335*** | (2015.01) |
| ***H04R 1/02*** | (2006.01) |
| ***H04R 3/00*** | (2006.01) |

(52) U.S. Cl.
CPC ............... *H04R 1/028* (2013.01); *H04R 3/00* (2013.01); *H04R 2400/11* (2013.01); *H04R 2420/07* (2013.01); *H04R 2499/11* (2013.01)

(58) Field of Classification Search
CPC ... H01Q 9/42; H01Q 1/24; H01Q 1/38; H04R 1/025; H04R 1/028; H04R 3/00; H04R 2400/11; H04R 2420/07; H04R 2499/11; H04M 1/02; H04M 1/026
See application file for complete search history.

(56) References Cited

U.S. PATENT DOCUMENTS

| | | | | |
|---|---|---|---|---|
| 2006/0038733 | A1* | 2/2006 | Wedel .................. | H04B 1/3833 343/795 |
| 2014/0009344 | A1 | 1/2014 | Zhu et al. | |
| 2015/0372384 | A1 | 12/2015 | Liu et al. | |
| 2016/0308282 | A1 | 10/2016 | Chang | |
| 2016/0360015 | A1 | 12/2016 | Lee et al. | |
| 2017/0033442 | A1 | 2/2017 | Choi et al. | |
| 2017/0244151 | A1 | 8/2017 | Han et al. | |
| 2017/0288311 | A1 | 10/2017 | Zhong et al. | |
| 2020/0028949 | A1 | 1/2020 | Kim et al. | |

FOREIGN PATENT DOCUMENTS

| | | | |
|---|---|---|---|
| KR | 10-2017-0015015 | A | 2/2017 |
| KR | 10-1704939 | B1 | 2/2017 |
| KR | 10-2017-0098401 | A | 8/2017 |
| KR | 10-1915388 | B1 | 11/2018 |
| KR | 10-2020-0009251 | A | 1/2020 |

OTHER PUBLICATIONS

International Search Report (PCT/ISA/210) dated Nov. 16, 2022, issued by the International Searching Authority in International Application No. PCT/KR2022/011564.

Written Opinion (PCT/ISA/237) dated Nov. 16, 2022, issued by the International Searching Authority in International Application No. PCT/KR2022/011564.

Communication issued Dec. 17, 2025 by the Korean Ministry of Intellectual Property in Korean Patent Application No. 10-2021-0133368.

* cited by examiner

ELECTRONIC DEVICE COMPRISING ANTENNA

CROSS-REFERENCE TO RELATED APPLICATIONS

This application is a continuation of International Application No. PCT/KR2022/011564, filed on Aug. 4, 2022, which is based on and claims priority to Korean Patent Application No. 10-2021-0133368, filed on Oct. 7, 2021, in the Korean Intellectual Property Office, the disclosures of which are incorporated by reference herein in their entireties.

BACKGROUND

1. Field

The disclosure relates to an electronic device including an antenna.

2. Description of Related Art

Electronic devices (e.g., smart phones, tablets, or wearable devices) can provide various functions in addition to voice communication. For example, the electronic devices can provide various functions, such as a short-range wireless communication (e.g., Bluetooth, Wi-Fi, or near field communication (NFC)) function, a mobile communication (3rd generation (3G), 4G, 5G, etc.) function, a music or video playback function, a shooting function, or a navigation function.

The electronic device may include a speaker module for providing a sound output for voice communication, music, or video. Also, the electronic device may include an antenna that is adjacent to the speaker module and supports wireless communication.

The electronic device may include a conductive path that delivers a low frequency signal (e.g., a direct current (DC) signal) for controlling the speaker module, and a conductive pattern that operates as an antenna radiator. A signal delivered to the conductive pattern can correspond to a high frequency signal (e.g., an AC signal). When the conductive path and the conductive pattern are manufactured separately, a production process can become complicated and a manufacturing cost can increase.

Also, the electronic device may include a separate conductive connection member in order to connect the conductive path and the conductive pattern to a control circuit and a wireless communication circuit, respectively. For example, the conductive path can be connected to the control circuit (e.g., an application processor) controlling the speaker module through a first conductive connection member (e.g., a C-clip). For another example, the conductive pattern can be connected to the wireless communication circuit (e.g., a communication processor) through a second conductive connection member. However, when the electronic device includes the respective separate conductive connection members, a material cost can increase, and there can be a disadvantage of limiting a mounting space of the electronic device.

SUMMARY

Provided is an electronic device that may include a conductive pattern including a first portion connected to a speaker module and a second portion operating as an antenna radiator.

According to an aspect of the disclosure, an electronic device includes: a first frame forming at least a portion of a first edge of the electronic device; a speaker module adjacent to the first frame; a wireless communication circuit; a first capacitor; a conductive connection member connected to the wireless communication circuit via the first capacitor; a conductive pattern connected to the conductive connection member at a first point, wherein the conductive pattern may include: a first portion extending from the first point and connected to the speaker module, wherein the first portion may include a first inductor, and a second portion extending from the first point, wherein the second portion of the conductive pattern is configured to operate as an antenna radiator; and a control circuit electrically connected to the speaker module through the conductive connection member, wherein the wireless communication circuit is configured to transmit or receive a first signal in a first frequency band via a first electrical path including the first capacitor, the conductive connection member, and the second portion of the conductive pattern.

The control circuit may be configured to apply a second signal to the speaker module via a second electrical path including the conductive connection member and the first portion of the conductive pattern.

The second signal corresponds to a direct current (DC) signal.

The electronic device may further include a second inductor connected to the control circuit via the second inductor.

A first inductance of the first inductor has a value in a range of 100 nH and 120 nH.

The electronic device may further include a printed circuit board, and the wireless communication circuit and the control circuit may be on a face of the printed circuit board.

The electronic device may further include a support member disposed in a first direction perpendicular to the face of the printed circuit board, and the conductive pattern and the speaker module may be disposed in the first direction of the support member.

The electronic device may further include a matching circuit connected to the second portion of the conductive pattern, and the wireless communication circuit may be further configured to control the matching circuit to perform impedance matching corresponding to the first frequency band.

The conductive connection member may include a C-clip, a pogo-pin, or a coaxial cable.

The control circuit may include an application processor.

The electronic device may further include a flexible printed circuit board, and the conductive pattern may be on a face of the flexible printed circuit board.

An end of the second portion of the conductive pattern may be connected to a conductive portion of the first frame.

The wireless communication circuit may be further configured to feed power to the conductive portion of the first frame through the second portion of the conductive pattern and to transmit or receive a signal in a second frequency band.

The conductive pattern may have an L-shape.

The first frequency band may be 5 GHz to 6 GHz.

According to an embodiment of the disclosure, as a first portion of a conductive pattern connecting a speaker module to a control circuit is formed integrally with a second portion of the conductive pattern operating as an antenna, an electronic device may simplify a manufacturing process, and may minimize or reduce a manufacturing cost and a material cost.

According to an embodiment of the disclosure, an electronic device may separate a low frequency signal from a high frequency signal by using a capacitor and an inductor and prevent interference between the signals.

In addition, various effects directly or indirectly identified through this document may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
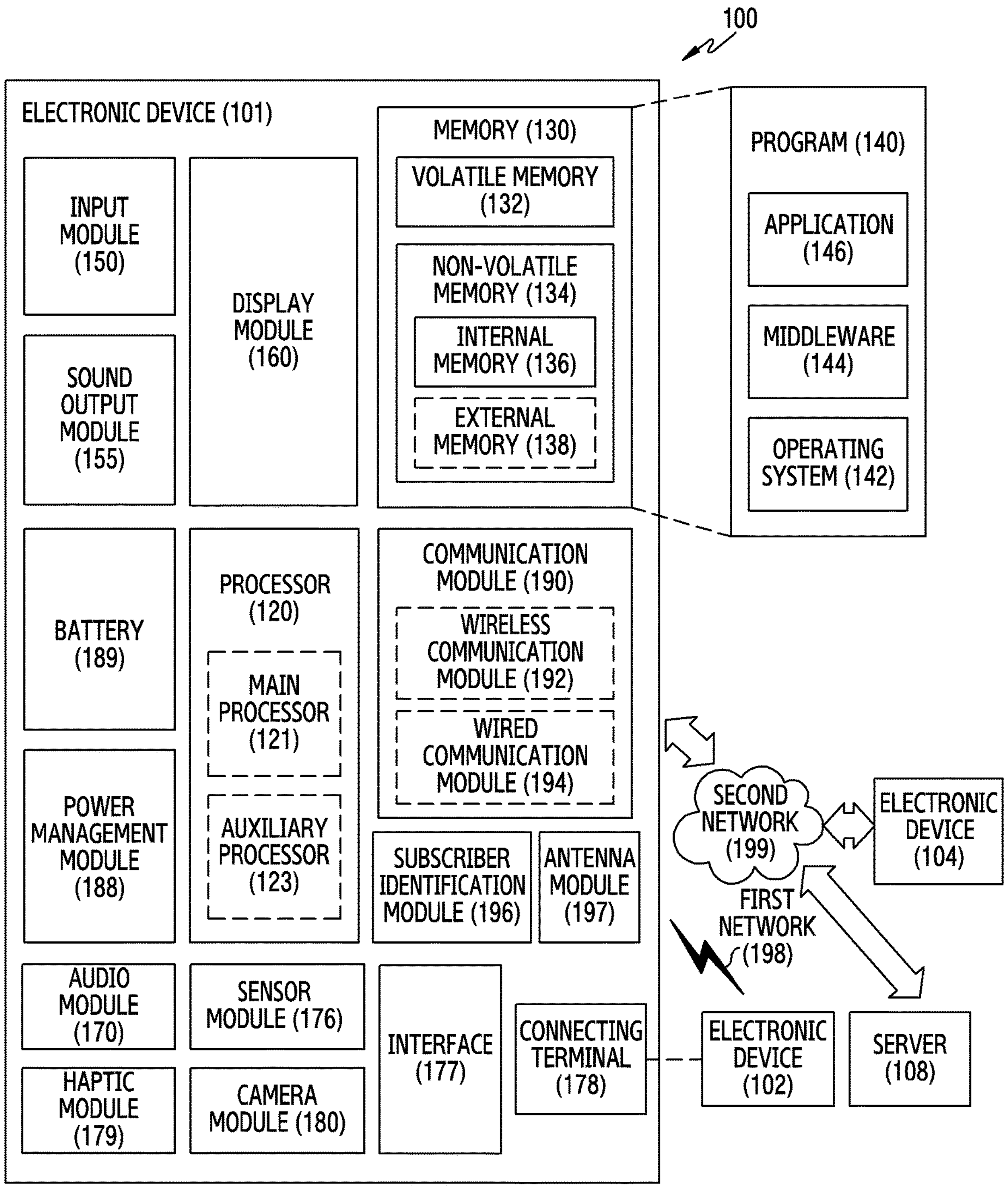
FIG. 1 is a diagram illustrating an electronic device in a network environment, according to an embodiment.

Various embodiments of the disclosure are described below with reference to the accompanying drawings. However, this is not intended to limit the disclosure to a specific embodiment form, and should be understood as including various modifications, equivalents, and/or alternatives to the embodiments of the disclosure. In relation to the description of the drawings, the same or similar reference numerals may be used for the same or similar components.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In one or more embodiments, at least one of the components (e.g., the connecting terminal 178) may be omitted from the electronic device 101, or one or more other components may be added in the electronic device 101. In one or more embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
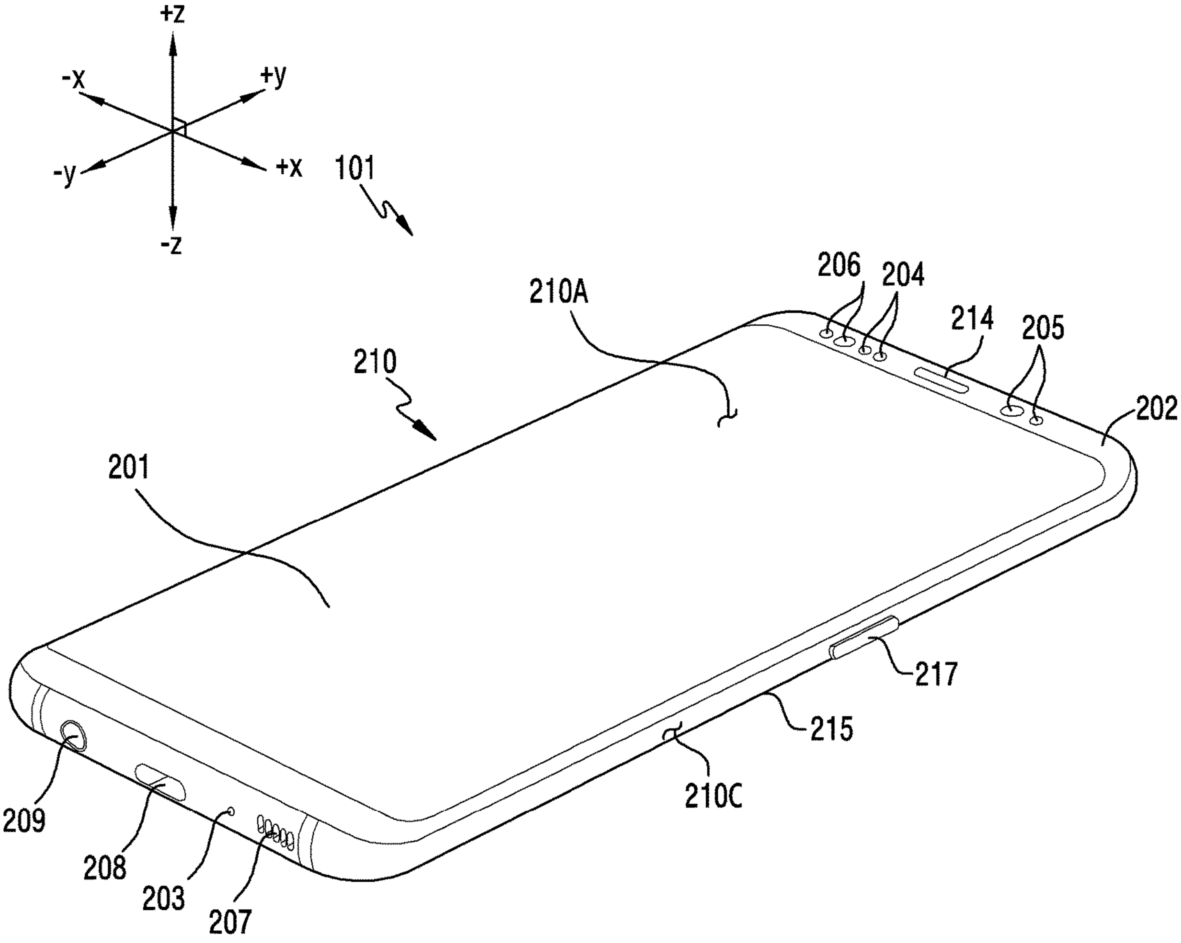
FIG. 2A is a perspective view illustrating an electronic device according to an embodiment.

FIG. 2A is a perspective view illustrating an electronic device according to an embodiment.

Figure 2B:
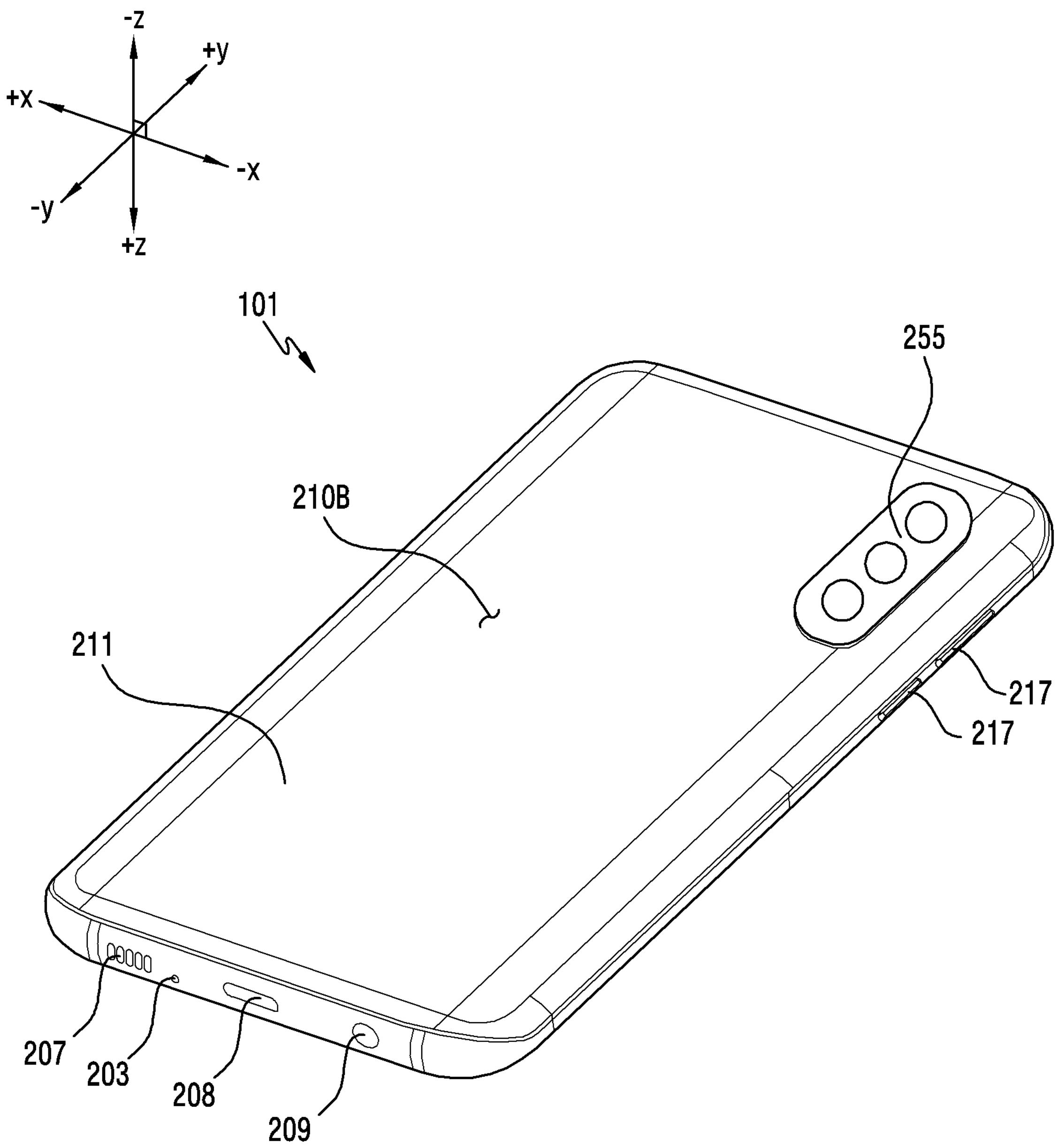
FIG. 2B is a perspective view illustrating the electronic device of FIG. 2A seen from the rear, according to an embodiment.

FIG. 2B is a perspective view illustrating the electronic device of FIG. 2A seen from the rear.

Referring to FIGS. 2A and 2B, an electronic device 101 of an embodiment may include a housing 210 including a first face (or a front face) 210A, a second face (or a rear face) 210B, and a side face (or a side wall) 210C surrounding a space between the first face 210A and the second face 210B. In another embodiment, a housing may also refer to a structure forming some of the first face 210A, the second face 210B, and the side face 210C of FIGS. 2A and 2B.

According to an embodiment, the first face 210A of the electronic device 101 may be formed at least in part by a substantially transparent front plate 202 (e.g., a glass plate including various coating layers, or a polymer plate). In an embodiment, the front plate 202 may include a curved portion that is bent and extended seamlessly from the first face 210A toward a rear cover 211 at least at one side edge portion.

According to an embodiment, the second face 210B may be formed by the substantially opaque rear cover 211. The rear cover 211 may be formed of, for example, coated or colored glass, ceramic, polymer, metal (e.g., aluminum (Al), stainless steel (STS), or magnesium (Mg)), or a combination of at least two of the above materials. According to an embodiment, the rear cover 211 may include a curved portion that is bent and extended seamlessly from the second face 210B toward the front plate 202 at least at one side edge portion.

According to an embodiment, the side face 210C of the electronic device 101 may be coupled to the front plate 202 and the rear cover 211, and may be formed by a frame structure 215 including metal and/or polymer. In another embodiment, the rear cover 211 and the frame structure 215 may be formed integrally, and may include substantially the same material (e.g., a metallic material such as aluminum).

According to an embodiment, the electronic device 101 may include at least one or more of a display 201, the audio module 170, a sensor module 204, a first camera module 205, a key input device 217, a first connector hole 208, and a second connector hole 209. In another embodiment, the electronic device 101 may omit at least one (e.g., the key input device 217) of the components or may additionally include other components. For example, a sensor such as a proximity sensor or illumination sensor may be integrated with the display 201 or be disposed adjacent to the display 201, within a region provided by the front plate 202. In an embodiment, the electronic device 101 may further include a light emitting device 206, and the light emitting device 206 may be disposed adjacent to the display 201 within the region provided by the front plate 202. For example, the light emitting device 206 may provide status information of the electronic device 101 in the form of light. In another embodiment, the light emitting device 206 may provide, for example, a light source linked to the operation of the first camera module 205. The light emitting device 206 may include, for example, a light emitting diode (LED), an infrared (IR) LED, and a xenon lamp.

The display 201 may be exposed, for example, through a significant portion of the front plate 202. In another embodiment, the edge of the display 201 may be formed to be substantially the same as an adjacent outer edge shape (e.g., a curved face) of the front plate 202. In a further embodiment, in order to expand an area where the display 201 is exposed, an outer edge of the display 201 and an outer edge of the front plate 202 may be formed to have generally the same gap therebetween. In a yet another embodiment, a recess or opening may be formed in a portion of a screen display region of the display 201, and other electronic components aligned with the recess or opening, such as the first camera module 205 and the non-shown proximity sensor or illumination sensor, may be included.

In another embodiment, the display 201 may be coupled to or be disposed adjacent to a touch detection circuit, a pressure sensor capable of measuring the intensity (pressure) of touch, and/or a digitizer detecting a magnetic field-type stylus pen.

In an embodiment, the audio module 170 may include a microphone hole 203, at least one speaker hole 207, and a call receiver hole 214. A microphone for acquiring external sound may be disposed inside the microphone hole 203, and in an embodiment, a plurality of microphones may be disposed to detect the direction of sound. In another embodiment, the at least one speaker hole 207 and the call receiver hole 214 may be implemented as a single hole along with the microphone hole 203, or a speaker may be included without the at least one speaker hole 207 and the call receiver hole 214 (e.g., a piezo speaker).

In an embodiment, the electronic device 101 may include the sensor module 204 to generate an electrical signal or data value corresponding to an internal operating state or external environmental state of the electronic device 101. The sensor module 204 may further include, for example, a proximity sensor disposed in the first face 210A of the housing 210, a fingerprint sensor integrated with or disposed adjacent to the display 201, and/or a biometric sensor (e.g., a heart rate monitor (HRM) sensor) disposed in the second face 210B of the housing 210. The electronic device 101 may further include at least one of non-shown sensor modules, for example, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illumination sensor.

In an embodiment, the electronic device 101 may include a second camera module 255 disposed in the second face 210B of the housing 210. The first camera module 205 and the second camera module 255 may include one or more lenses, an image sensor, and/or an image signal processor. A flash may be disposed in the second face 210B of the housing 210. The flash may include, for example, a light emitting diode or a xenon lamp. In another embodiment, two or more lenses (an infrared camera, and a wide-angle and telephoto lens) and image sensors may be disposed on a face of the electronic device 101.

In an embodiment, the key input device 217 may be disposed in the side face 210C of the housing 210. In another embodiment, the electronic device 101 may not include part or all of the key input device 217 mentioned above, and the key input devices 217 not included may be implemented in other forms such as a soft key on the display 201. In another embodiment, the key input device 217 may include at least a portion of the fingerprint sensor disposed in the second face 210B of the housing 210.

In an embodiment, the connector holes 208 and 209 may include the first connector hole 208 capable of accommodating a connector (e.g., a USB connector) for transmitting and receiving power and/or data with an external electronic device, and/the second connector hole (e.g., an earphone jack) 209 capable of accommodating a connector for transmitting and receiving an audio signal with the external electronic device.

In FIGS. 2A and 2B, the electronic device 101 is illustrated as a bar type, but this is only an example and the electronic device 101 may actually correspond to various types of devices. For example, the electronic device 101 may correspond to a foldable device, a slidable device, a wearable device (e.g., a smart watch, and a wireless earphone), or a tablet PC. Therefore, the embodiments of the present disclosure are not limited to the bar type device illustrated in FIGS. 2A and 2B and the electronic device may be various types of devices.

Figure 3:
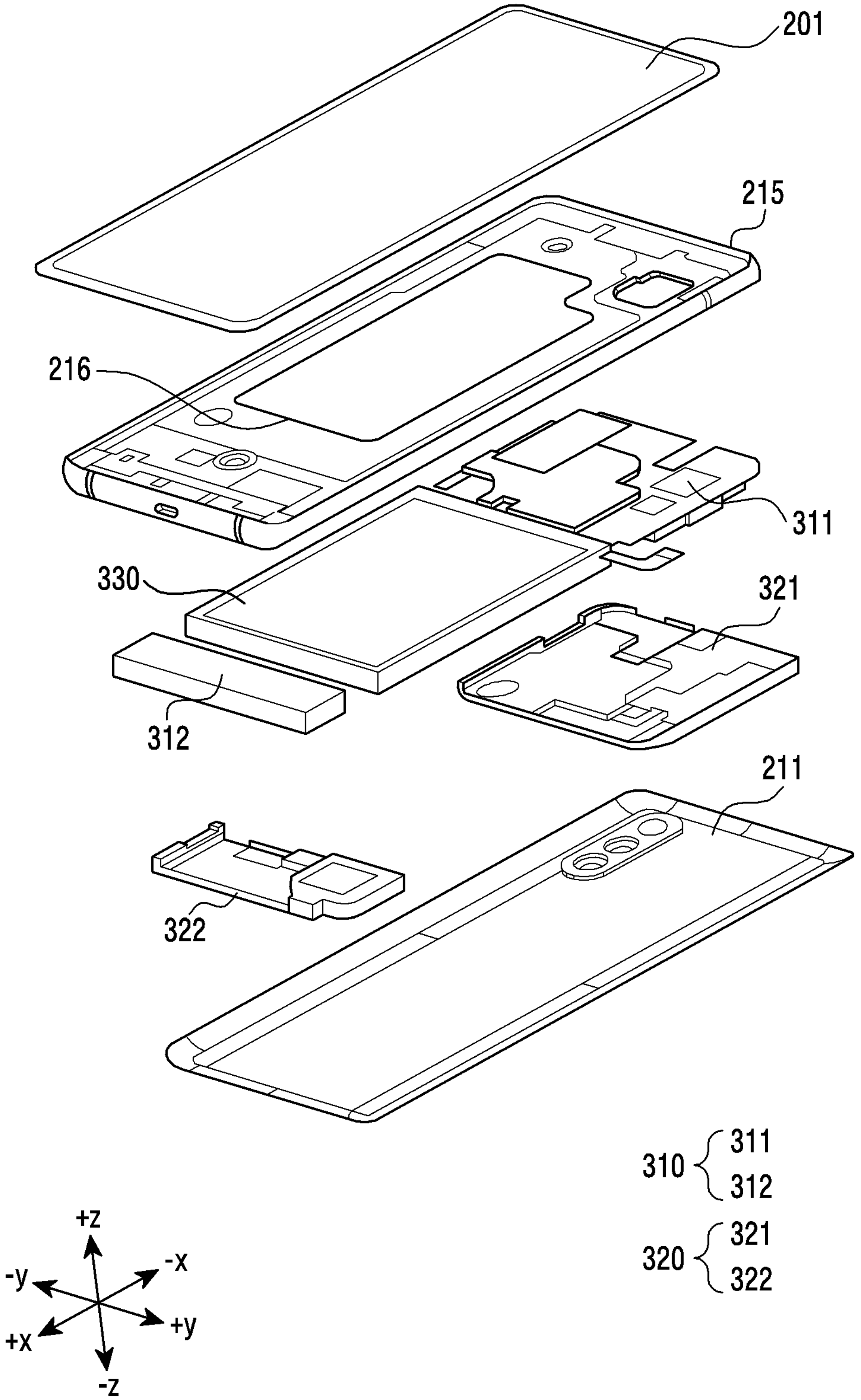
FIG. 3 is an exploded perspective view of an electronic device according to an embodiment.

FIG. 3 is an exploded perspective view of an electronic device according to an embodiment.

Referring to FIG. 3, the electronic device 101 may include the display 201, the frame structure 215, a bracket 216, a printed circuit board 310, a support member 320, a battery 330, and/or the rear cover 211.

According to an embodiment, at least a portion of the frame structure 215 may be formed of a conductive material (e.g., aluminum), and at least a portion of the frame structure 215 may be operated as an antenna radiator for transmitting and/or receiving a wireless communication signal.

According to an embodiment, the bracket 216 may be coupled to the frame structure 215 and may support various electronic components (e.g., the display 201) within the electronic device 101. In an embodiment, the bracket 216 may support various components of the electronic device 101 or provide a space for fixing the components of the electronic device 101. For example, the bracket 216 may be disposed below (e.g., −z direction) the display 201 and support the display 201. For another example, the bracket 216 may provide a space for fixing the battery 330. In an embodiment, the frame structure 215 may be coupled to the bracket 216. In another embodiment, the frame structure 215 may be formed integrally with the bracket 216. The word "bracket" may be replaced with the word "support member."

According to an embodiment, the printed circuit board 310 may include a first printed circuit board 311 and/or a second printed circuit board 312. In an embodiment, the printed circuit board 310 may be disposed between the bracket 216 and the support member 320. In an embodiment, various electronic components (e.g., the processor 120 and the memory 130) may be disposed in the printed circuit board 310. In an embodiment, the printed circuit board 310 may provide an electrical connection path between various electronic components of the electronic device 101. For example, the camera module 180, the battery 330, the display 201, and the processor 120 may be each directly or indirectly electrically connected to the printed circuit board 310, and the processor 120 may be operatively coupled to the camera module 180, the battery 330, and the display 201 through the electrical connection path provided by the printed circuit board 310. The word “camera module” can be replaced with the word “camera circuit.”

According to an embodiment, the battery 330 may be located below (e.g., −z direction) the bracket 216 and may be fixed by the bracket 216. The battery 330 may store power required for the electronic device 101. For example, the battery 330 may include a non-rechargeable primary cell, a rechargeable secondary cell, or a fuel cell. The battery 330 may be disposed integrally within the electronic device 101, or may be disposed to be detachable from the electronic device 101.

According to an embodiment, the support member 320 may include a first support member 321 and/or a second support member 322. In an embodiment, the support member 320 may be disposed below (e.g., −z direction) the printed circuit board 310 and support the printed circuit board 310. The support member 320 may include metal and/or non-metal (e.g., polymer).

According to an embodiment, the rear cover 211 may be disposed below (e.g., −z direction) the support member 320. In an embodiment, the rear cover 211 may be physically coupled to the frame structure 215. For example, the rear cover 211 may be coupled to the frame structure 215 by at least one coupling member (e.g., a screw). For another example, the rear cover 211 may be coupled to the frame structure 215 by an adhesive member (e.g., an adhesive tape or adhesive liquid). In an embodiment, the rear cover 211 may be formed by coated or colored glass, ceramic, polymer, metal (e.g., aluminum, stainless steel, or magnesium), or a combination of at least two of the above materials. According to another embodiment, the rear cover 211 may be formed integrally with the frame structure 215.

Figure 4A:
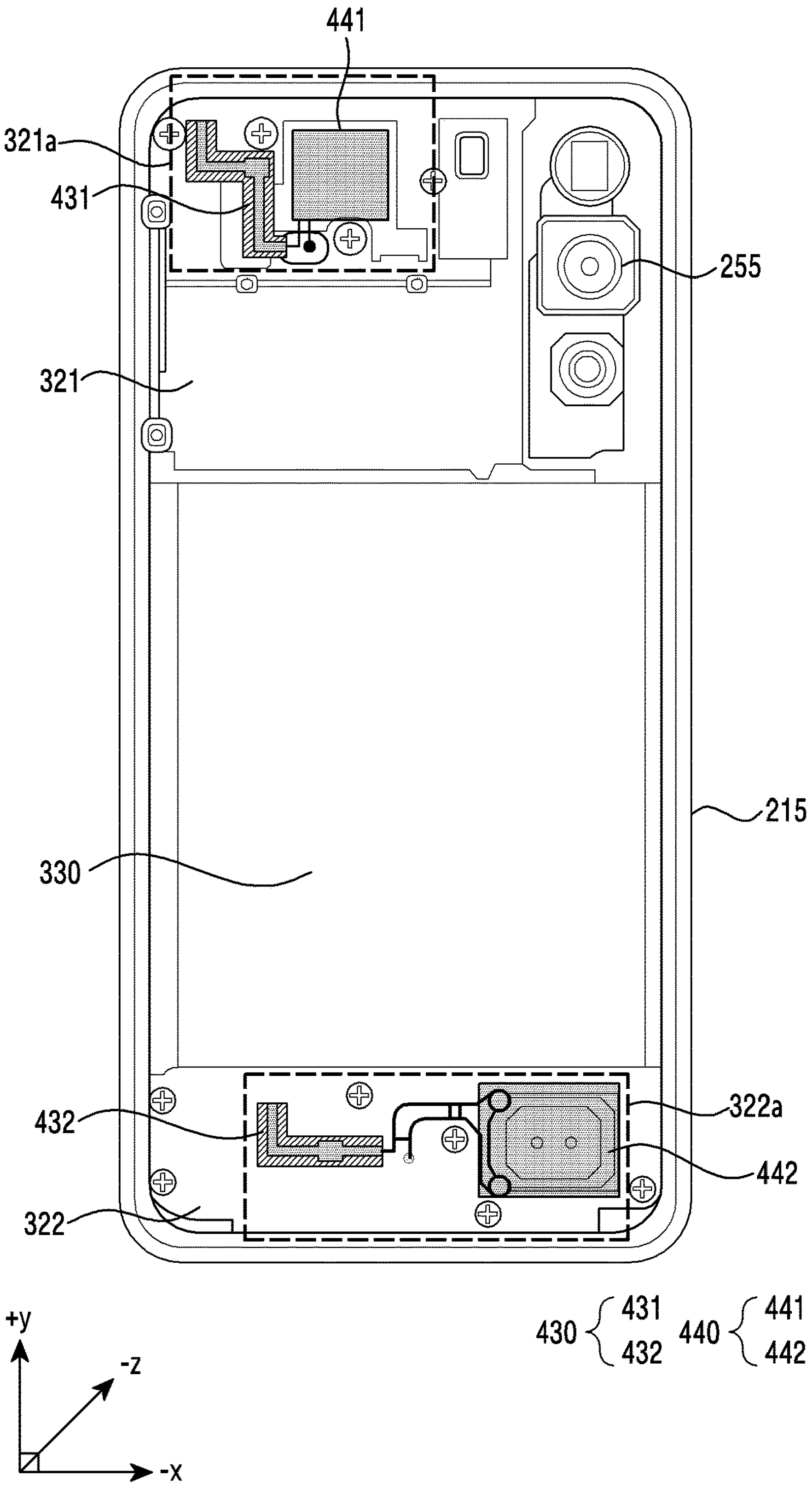
FIG. 4A is a diagram for explaining the positions of conductive structures connected to speaker modules in an electronic device, according to an embodiment.

FIG. 4A is a diagram for explaining the positions of conductive structures connected to speaker modules in an electronic device, according to an embodiment.

Referring to FIG. 4A, the electronic device 101 of an embodiment may include a speaker module 440. The speaker module 440 may include a first speaker module 441 and/or a second speaker module 442. In an embodiment, the speaker module 440 may be disposed in various positions of the support member 320. For example, the first speaker module 441 may be disposed in a first portion 321*a* of the first support member 321. The first speaker module 441 may be located in a first direction (e.g., −z direction) of the first support member 321. For example, the second speaker module 442 may be disposed in a second portion 322*a* of the second support member 322. The second speaker module 442 may be located in a first direction (e.g., −z direction) of the second support member 322. The word “speaker module” can be replaced with the word “speaker circuit.”

According to an embodiment, the electronic device 101 may include a conductive structure 430 (e.g., a flexible printed circuit board (FPCB)), and the conductive structure 430 may include a first conductive structure 431 and/or a second conductive structure 432. In an embodiment, the first conductive structure 431 may be located in the first direction (e.g., −z direction) of the first support member 321 and may be electrically connected to the first speaker module 441, and the second conductive structure 432 may be located in the first direction (e.g., −z direction) of the second support member 322 and may be electrically connected to the second speaker module 442. The structure and electrical connection relationship of each of the conductive structure 430 and the speaker module 440 will be described in detail in FIG. 4B below.

Figure 4B:
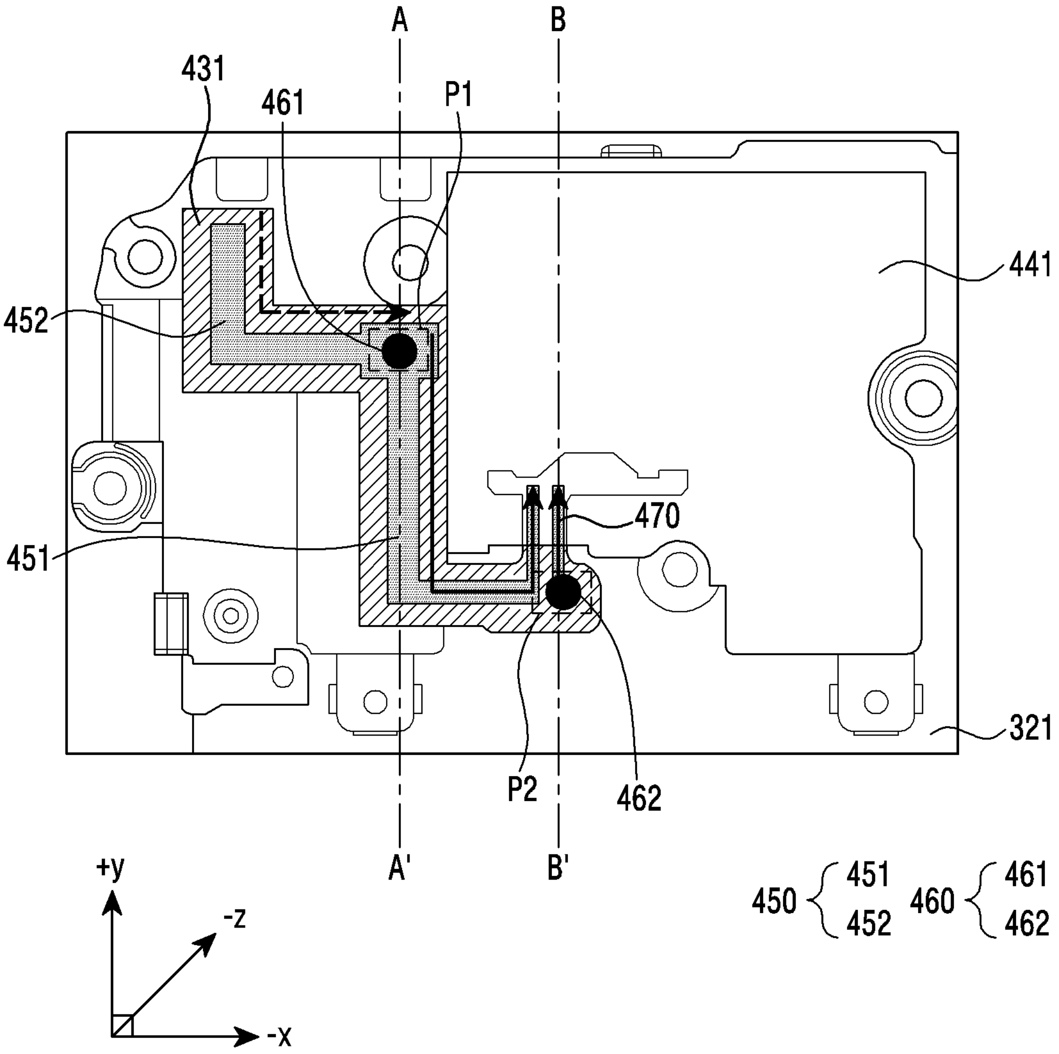
FIG. 4B is an enlarged view of a first region of a first support member where a first conductive structure and a first speaker module illustrated in FIG. 4A are disposed, according to an embodiment.

FIG. 4B is an enlarged view of a first region of a first support member where a first conductive structure and a first speaker module illustrated in FIG. 4A are arranged.

Referring to FIG. 4B, the first conductive structure 431 of an embodiment may include a first conductive pattern 450. The first conductive pattern 450 may include a first portion 451 and/or a second portion 452. For example, the first conductive pattern 450 may include the first portion 451 extending from a first point P1 and connected to the first speaker module 441. For example, the first conductive pattern 450 may include the second portion 452 extending from the first point P1. The second portion 452 may be used as an antenna radiator as described later in FIG. 7. The first point P1 may refer to a point connected to a first wireless communication circuit via a first conductive connection member 461 (e.g., C-clip) as described later in FIG. 5. In an embodiment, the first conductive pattern 450 may be formed of metal (e.g., copper (Cu)).

According to an embodiment, the second portion 452 of the first conductive pattern 450 operating as the antenna radiator may have various shapes. For example, the second portion 452 of the first conductive pattern 450 may have an L-shape. In an embodiment, the shape and/or electrical length of the second portion 452 of the first conductive pattern 450 may correspond to a frequency band of a signal that the electronic device 101 will transmit and/or receive with an external electronic device through the first conductive pattern 450.

According to an embodiment, the first conductive structure 431 may include an additional conductive pattern 470 extending from a second point P2 and connected to the first speaker module 441. The second point P2 may refer to a point connected to a first control circuit via a second conductive connection member 462 (e.g., a C-clip) as described later in FIG. 6.

Figure 5:
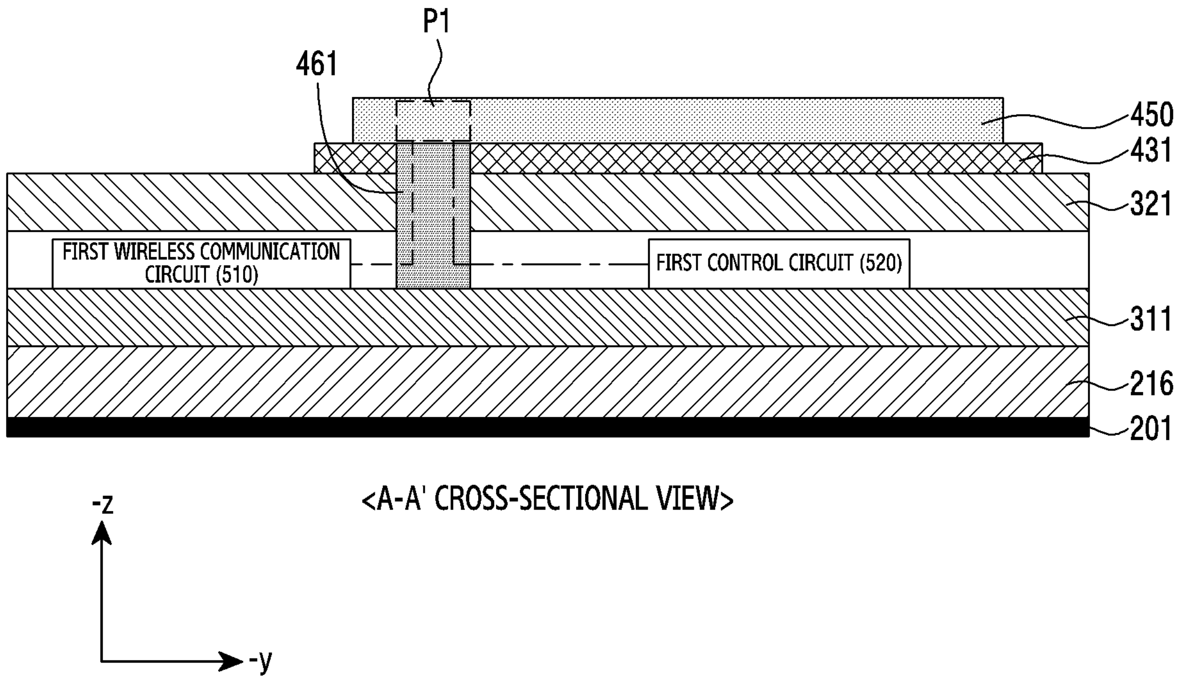
FIG. 5 illustrates a cross-sectional view taken along line A-A' of the first conductive structure illustrated in FIG. 4B, according to an embodiment.

FIG. 5 illustrates a cross-sectional view taken along line A-A' of the first conductive structure illustrated in FIG. 4B, according to an embodiment.

Referring to FIG. 5, the electronic device 101 of an embodiment may include a first wireless communication circuit 510, and the first wireless communication circuit 510 may be disposed on a face of the first printed circuit board 311. The electronic device 101 may include a first control circuit 520, and the first control circuit 520 may be disposed on a face of the first printed circuit board 311. In an embodiment, the first wireless communication circuit 510 and first control circuit 520 of FIG. 5 are illustrated as being disposed on a face of the first printed circuit board 311, but this is just an example for convenience of explanation. The first wireless communication circuit 510 and the first control circuit 520 may be disposed in various positions of the first printed circuit board 311. In an embodiment, the first control circuit 520 may correspond to a circuit that controls the operation of the first speaker module 441. For example, the first control circuit 520 may include an application processor.

According to an embodiment, the first support member 321 may be located in a first direction (e.g., −z direction) with respect to the first printed circuit board 311, and the first conductive structure 431 may be located in a first direction (e.g., −z direction) of the support member 321. The first direction (e.g., −z direction) may be referred to as a direction perpendicular to a face of the first printed circuit board 311 on which the first wireless communication circuit 510 and the first control circuit 520 are disposed.

According to an embodiment, the electronic device 101 may include the first conductive connection member 461. The first conductive connection member 461 may be disposed at a point of the first printed circuit board 311 and may be electrically connected to the first wireless communication circuit 510 and the first control circuit 520. The first conductive connection member 461 may be formed to penetrate the first support member 321 and the first conductive structure 431, and may be electrically connected to the first conductive pattern 450 at the first point P1. As a result, the first wireless communication circuit 510 and the first control circuit 520 may be electrically connected to the first conductive pattern 450 through the first conductive connection member 461.

Figure 6:
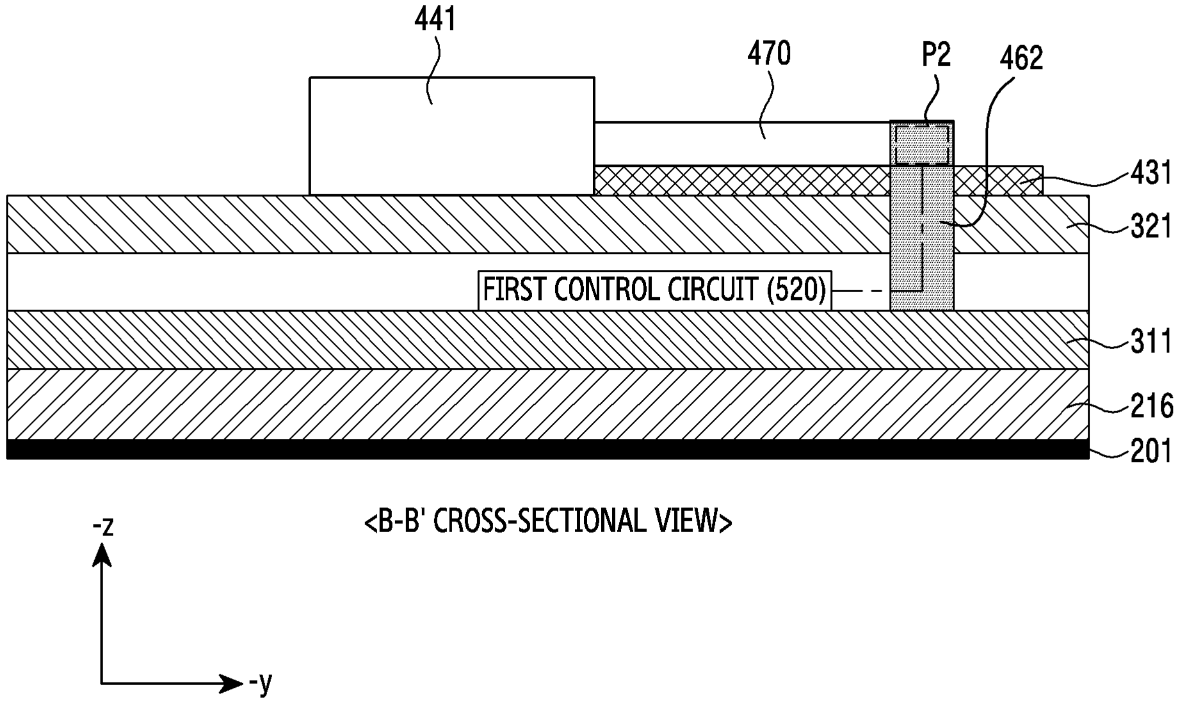
FIG. 6 illustrates a cross-sectional view taken along line B-B' of the first conductive structure illustrated in FIG. 4B, according to an embodiment.

FIG. 6 illustrates a cross-sectional view taken along line B-B' of the first conductive structure illustrated in FIG. 4B, according to an embodiment.

Referring to FIG. 6, the first control circuit 520 of an embodiment may be electrically connected to the first speaker module 441 via the second conductive connection member 462 and the additional conductive pattern 470. For example, the second conductive connection member 462 may be formed to penetrate the first support member 321 and the first conductive structure 431 and may be electrically connected to the additional conductive pattern 470. The additional conductive pattern 470 may be electrically connected to the first speaker module 441. Since the first control circuit 520 is electrically connected to the second conductive connection member 462, as a result, the first control circuit 520 may be electrically connected to the speaker module 441 via the second conductive connection member 462 and the additional conductive pattern 470.

In an embodiment, the first control circuit 520 may transmit a control signal to the first speaker module 441 or receive a signal from the first speaker module 441. Signals transmitted and/or received between the first control circuit 520 and the first speaker module 441 may correspond to low frequency signals (e.g., DC signals).

Figure 7:
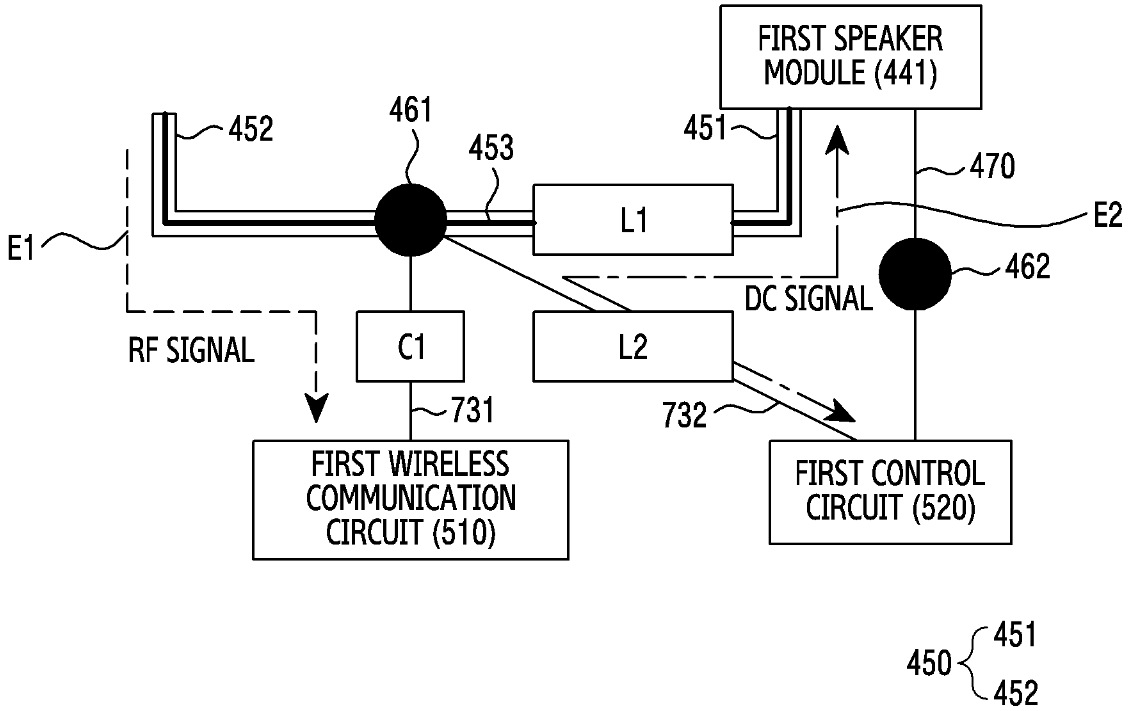
FIG. 7 is a conceptual diagram illustrating an electrical connection relationship between a first speaker module, a first conductive pattern, a first wireless communication circuit, and a first control circuit, according to an embodiment.

FIG. 7 is a conceptual diagram illustrating an electrical connection relationship between a first speaker module, a first conductive pattern, a first wireless communication circuit, and a first control circuit, according to an embodiment.

Referring to FIG. 7, according to an embodiment, the first portion 451 of the first conductive pattern 450 may be electrically connected to the first speaker module 441, and may include a first inductor L1. In FIG. 7, a description has been made as a concept in which the first portion 451 includes the first inductor L1 but this is only an example. For example, a description may be also made as a concept in which the first inductor L1 is formed in the first portion 451 of the first conductive pattern 450.

According to an embodiment, the second portion 452 of the first conductive pattern 450 may operate as an antenna radiator through feeding of power from the first wireless communication circuit 510. For example, the first wireless communication circuit 510 may feed power to the first conductive pattern 450 via a first connection path 731 and the first conductive connection member 461. In this case, the second portion 452 of the first conductive pattern 450, and/or a third portion 453 between the first point P1 at which the first conductive connection member 461 contacts with the first conductive pattern 450 and the first inductor L1, may operate as an antenna radiator. In this case, the reason only the second portion 452 and the third portion 453 operate as the antenna radiators except the first portion 451 may be that a high frequency signal is blocked by the first inductor L1. In an example, the third portion 453 may substantially correspond to part of the first portion 451 of the first conductive pattern 450. For example, the second portion 452 and/or third portion 453 of the first conductive pattern 450 may correspond to antenna radiators of various antenna types. For example, the second portion 452 and/or third portion 453 of the first conductive pattern 450 may correspond to dipole, monopole, and/or inverted-F antenna (IFA) antenna radiators.

According to an embodiment, the first wireless communication circuit 510 and the first control circuit 520 may be electrically connected to the first conductive pattern 450 via the first conductive connection member 461. For example, the first wireless communication circuit 510 may be electrically connected to the first conductive connection member 461 through the first connection path 731. In an example, a first capacitor C1 may be disposed in the first connection path 731. For another example, the first control circuit 520 may be electrically connected to a first conductive connection member 461 through a second connection path 732. In an example, a second inductor L2 may be disposed in the second connection path 732. In an embodiment, the first control circuit 520 may be electrically connected to the first speaker module 441 via the additional conductive pattern 470. In FIG. 7, a description has been made as a concept in which the second inductor L2 is disposed in the second connection path 732 but this is just an example. For example, a description may be made as a concept in which the second inductor L2 is formed in the second connection path 732. For example, a description may be made as a concept in which the second inductor L2 is included in the second connection path 732.

According to an embodiment, the first wireless communication circuit 510 may feed power to the second portion 452 of the first conductive pattern 450 and transmit and/or receive a signal in a specified frequency band with an external electronic device. For example, the first wireless communication circuit 510 may transmit and/or receive a signal in a first frequency band by using a first electrical path E1 that includes the first capacitor C1, the first conductive connection member 461, and/or the second portion 452 of the first conductive pattern 450. For example, the first wireless communication circuit 510 may transmit and/or receive the signal in the first frequency band by using the first electrical path E1 that is formed by the first capacitor C1, the first conductive connection member 461, and/or the second portion 452 of the first conductive pattern 450.

According to an embodiment, as the first capacitor C1 is disposed in the first connection path 731, the first wireless communication circuit 510 may block a low frequency signal (e.g., DC signal). For example, when the first capacitor C1 is not disposed in the first connection path 731, a low frequency signal (e.g., DC signal) applied to the first conductive pattern 450 by the first control circuit 520 may be delivered to the first wireless communication circuit 510 via the first connection path 731. On the other hand, when the first capacitor C1 of an embodiment is disposed in the first connection path 731, the first wireless communication circuit 510 may not receive a low frequency signal (e.g., DC signal) applied to the first conductive pattern 450.

According to an embodiment, the first control circuit 520 may transmit a control signal to, and/or receive from, the first speaker module 441 through the first portion 451 of the first conductive pattern 450. For example, the first control circuit 520 may apply a signal to the first speaker module 441 by using a second electrical path E2 that includes the second inductor L2, the first conductive connection member 461, and/or the first portion 451 of the first conductive pattern 450.

According to an embodiment, as the first inductor L1 is disposed in the first portion 451 of the first conductive pattern 450, and the second inductor L2 is disposed in the second connection path 732, the first control circuit 520 may block a high frequency signal (e.g., alternating current (AC) signal). For example, when the first inductor L1 and/or the second inductor L2 are not disposed, a high frequency signal (e.g., AC signal) applied to the first conductive pattern 450 by the first wireless communication circuit 510 may be delivered to the first control circuit 520 via the second connection path 732. On the other hand, when the first inductor L1 of an embodiment is disposed in the first portion 451, or the second inductor L2 is disposed in the second connection path 732, the first control circuit 520 may not receive, from an external electronic device, a high frequency signal (e.g., AC signal) applied to the first conductive pattern 450.

As a result, the electronic device 101 may be prevented from transmitting a low frequency signal to the first wireless communication circuit 510 through the first inductor L1, the second inductor L2, and/or the first capacitor C1, or transmitting a high frequency signal to the first control circuit 520, even though the first portion 451 of the first conductive pattern 450 used as a connection path between the first speaker module 441 and the first control circuit 520 of an embodiment is formed integrally with the second portion 452 used as an antenna radiator.

Figure 8:
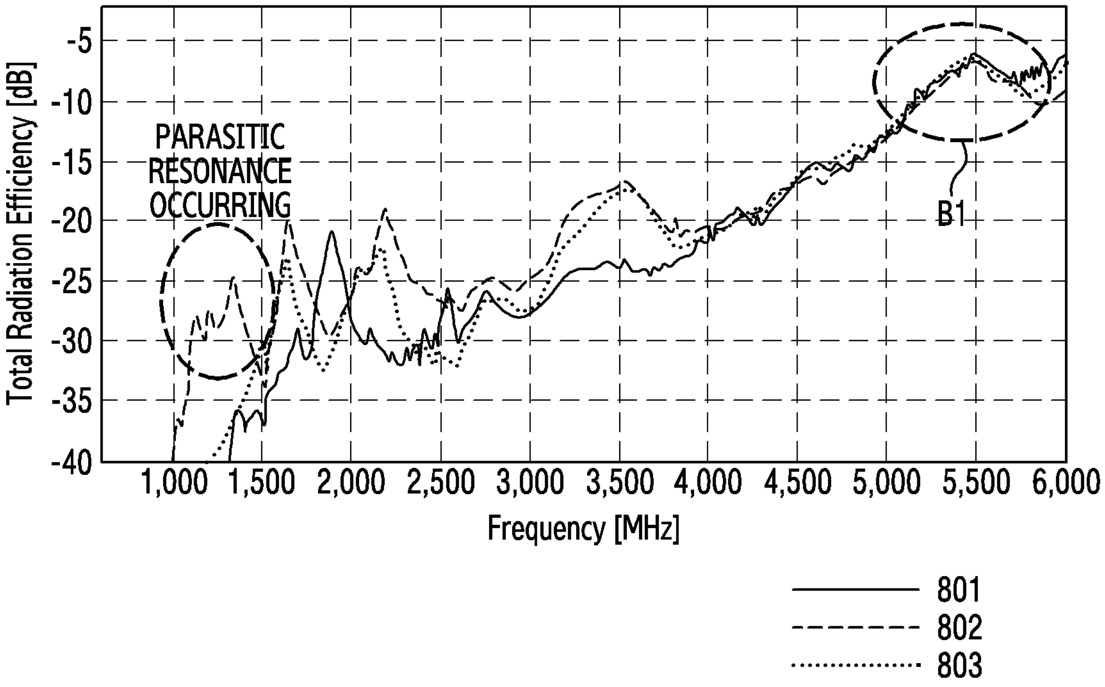
FIG. 8 is a diagram for comparing antenna radiation efficiency graphs dependent on the arrangement or non-arrangement of a first inductor, according to an embodiment.

FIG. 8 is a diagram for comparing antenna radiation efficiency graphs dependent on the arrangement or non-arrangement of a first inductor, according to an embodiment.

Referring to FIG. 8, a first graph 801 is an antenna radiation efficiency graph when a conductive pattern used as an antenna radiator is implemented independently without electrically connecting to the first speaker module 441. A second graph 802 is an antenna radiation efficiency graph when the first inductor L1 is not disposed in the first portion 451 of the first conductive pattern 450. A third graph 803 of an embodiment is an antenna radiation efficiency graph when the first inductor L1 is disposed in the first portion 451 of the first conductive pattern 450. For example, a first inductance of the first inductor L1 may correspond to an appropriate value between about 100 nH and about 120 nH.

Referring to the first graph 801, the second graph 802, and the third graph 803 of an embodiment, the first graph 801, second graph 802, and third graph 803 show the radiation efficiency of about −10 dB to about −5 dB in a frequency band B1 of about 5 GHz to about 6 GHz. Therefore, even when using the first conductive pattern 450 including the first portion 451 and the second portion 452, the electronic device 101 of an embodiment may secure substantially the same antenna radiation efficiency as when separately implementing only the antenna radiator.

Comparing the second graph 802 with the third graph 803 of an embodiment, the second graph 802 shows a relatively high antenna radiation efficiency compared to the third graph 803, in a frequency band of about 1 GHz to about 1.5 GHz. As an inductor (e.g., the first inductor L1) is not disposed in the first portion 451 of the first conductive pattern 450, parasitic resonance in the frequency band of about 1 GHz to about 1.5 GHz may be caused by the influence of a low frequency signal (e.g., DC signal) applied by the first control circuit 520. On the other hand, in the third graph 803 of an embodiment, it may be identified that the parasitic resonance does not occur in the frequency band of about 1 gigahertz (GHz) to about 1.5 GHz.

Accordingly, the electronic device 101 of an embodiment may arrange the first inductor L1 in the first portion 451 of the first conductive pattern 450, thereby minimizing and/or reducing the influence of a low frequency signal applied by the first control circuit 520, and preventing the occurrence of parasitic resonance.

Figure 9:
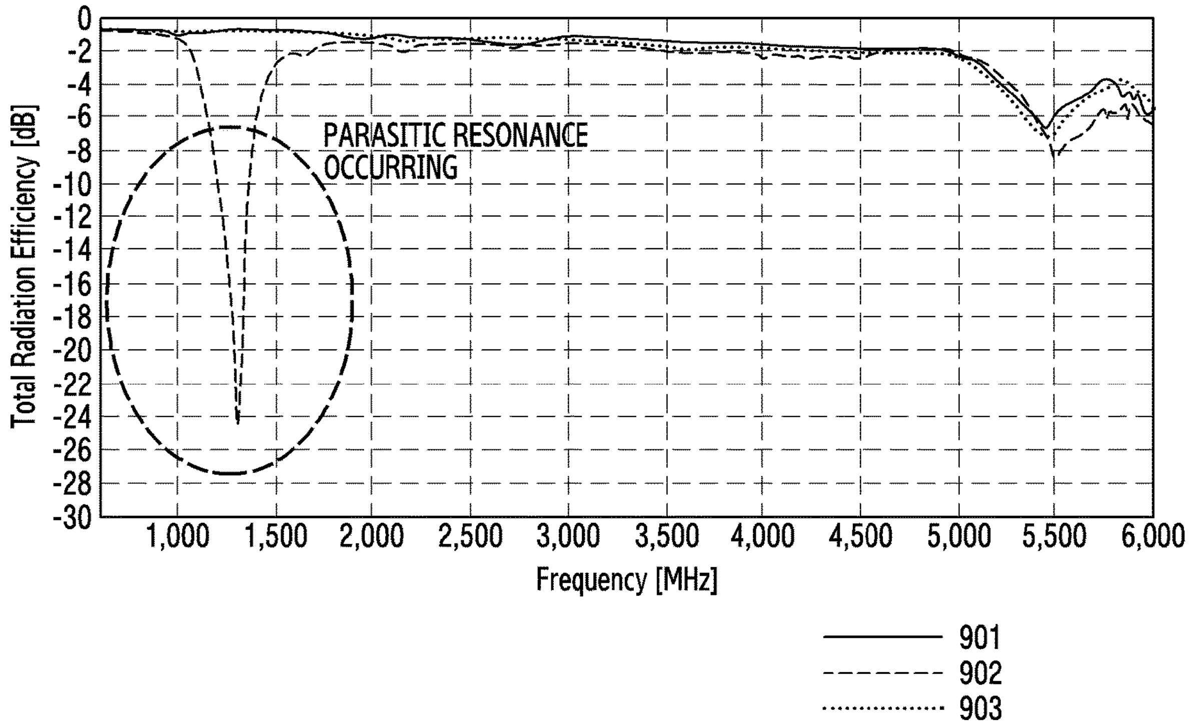
FIG. 9 is a diagram for comparing S11 graphs dependent on the arrangement or non-arrangement of a first inductor, according to an embodiment.

FIG. 9 is a diagram for comparing S11 graphs dependent on the arrangement or non-arrangement of a first inductor, according to an embodiment.

Referring to FIG. 9, a first graph 901 of an embodiment is an S11 graph when a conductive pattern used as an antenna radiator is implemented independently without electrically connecting to the first speaker module 441. A second graph 902 is an S11 graph when the first inductor L1 is not disposed in the first portion 451 of the first conductive pattern 450. A third graph 903 of an embodiment is an S11 graph when the first inductor L1 is disposed in the first portion 451 of the first conductive pattern 450.

Comparing the second graph 902 with the third graph 903 of an embodiment, the second graph 902 shows a relatively low S11 value (e.g., about −4 dB to about −24 dB) compared to the third graph 903, in a frequency band of about 1 GHz to about 1.5 GHz, and this may correspond to parasitic resonance. As an inductor (e.g., the first inductor L1) is not disposed in the first portion 451 of the first conductive pattern 450, the parasitic resonance shown in the second graph 902 may be caused by the influence of a low frequency signal (e.g., DC signal) applied by the first control circuit 520.

Accordingly, the electronic device 101 of an embodiment may arrange the first inductor L1 in the first portion 451 of the first conductive pattern 450, thereby minimizing and/or reducing the influence of the low frequency signal applied by the first control circuit 520, and preventing and/or reducing the occurrence of parasitic resonance in a specific frequency band (e.g., about 1 GHz to about 1.5 GHz).

Figure 10A:
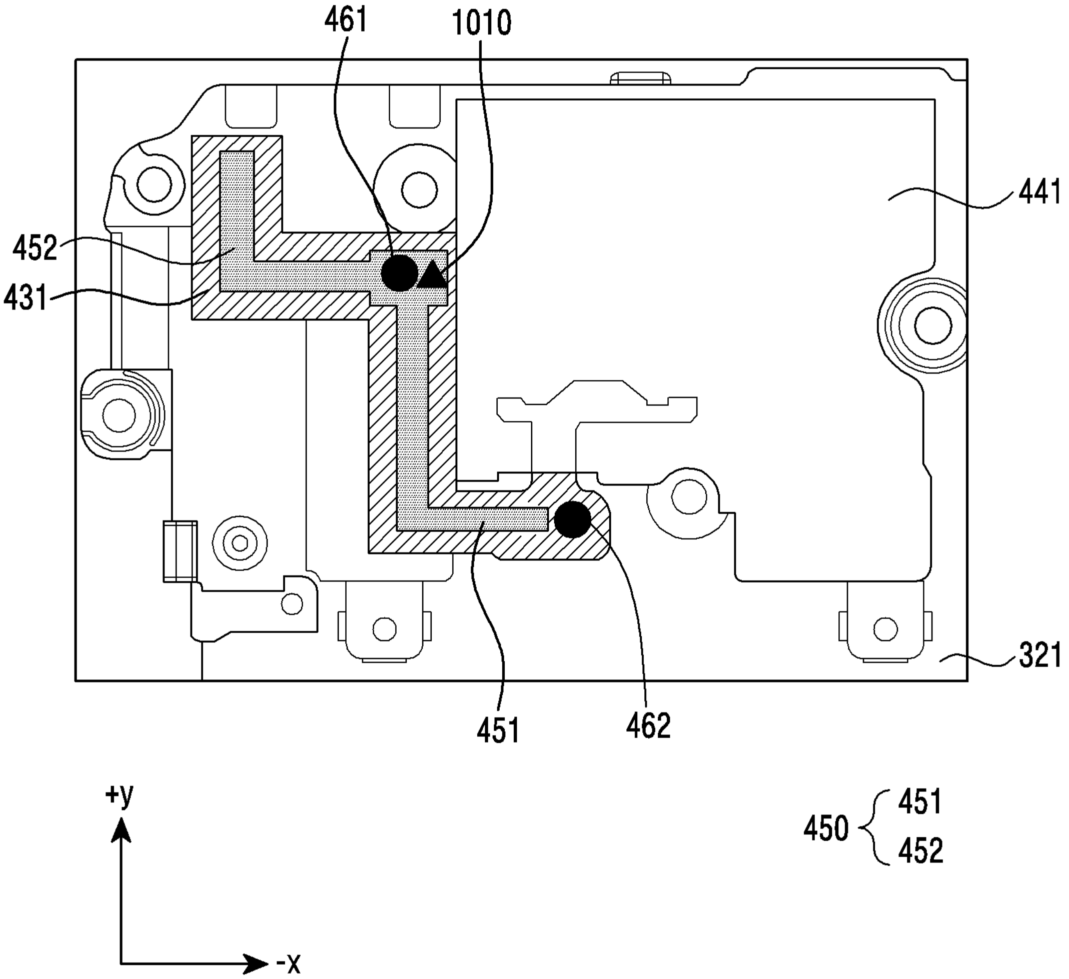
FIG. 10A is a diagram illustrating a first conductive structure including a matching circuit, according to an embodiment.

FIG. 10A is a diagram illustrating a conductive structure including a matching circuit, according to an embodiment.

Referring to FIG. 10A, the electronic device 101 of an embodiment may include a matching circuit 1010. For example, the matching circuit 1010 may be disposed in the first conductive pattern 450 and may be electrically connected to the second portion 452 of the first conductive pattern 450. In an embodiment, the first wireless communication circuit 510 may feed power to the second portion 452 of the first conductive pattern 450 and transmit and/or receive a signal in a first frequency band (e.g., about 5 GHz to about 6 GHz). In this case, the first wireless communication circuit 510 may control the matching circuit 1010 to perform impedance matching in response to the first frequency band.

According to an embodiment, the matching circuit 1010 may include various elements (e.g., a lumped element and a varactor), and may perform impedance matching by using the various elements. For example, the matching circuit 1010 may include a variable capacitor, and may adjust a capacitance value of the variable capacitor, thereby performing impedance matching. For another example, the matching circuit 1010 may include a varactor, and may adjust the capacitance of the varactor, thereby performing impedance matching. For further example, the matching circuit 1010 may include a switch circuit and lumped elements connected to the switch circuit, and may adjust an electrical connection relationship with the lumped element through the switch circuit, thereby performing impedance matching.

The matching circuit 1010 illustrated in FIG. 10A is illustrated as being disposed in the first conductive pattern 450, but this is for convenience of explanation and the matching circuit 1010 may actually be disposed in various positions. For example, the matching circuit 1010 may be disposed between the first wireless communication circuit 510 and the first conductive connection member 461. In other words, the matching circuit 1010 may be disposed in the first connection path 731 illustrated in FIG. 7.

For another example, the matching circuit 1010 may be disposed in the first printed circuit board 311. For further example, the matching circuit 1010 may be disposed in the first support member 321. For yet another example, the matching circuit 1010 may be disposed in the first conductive structure 431.

For example, the matching circuit 1010 may be formed in the first conductive pattern 450. For example, the matching circuit 1010 may be disposed on the first conductive pattern 450.

Figure 10B:
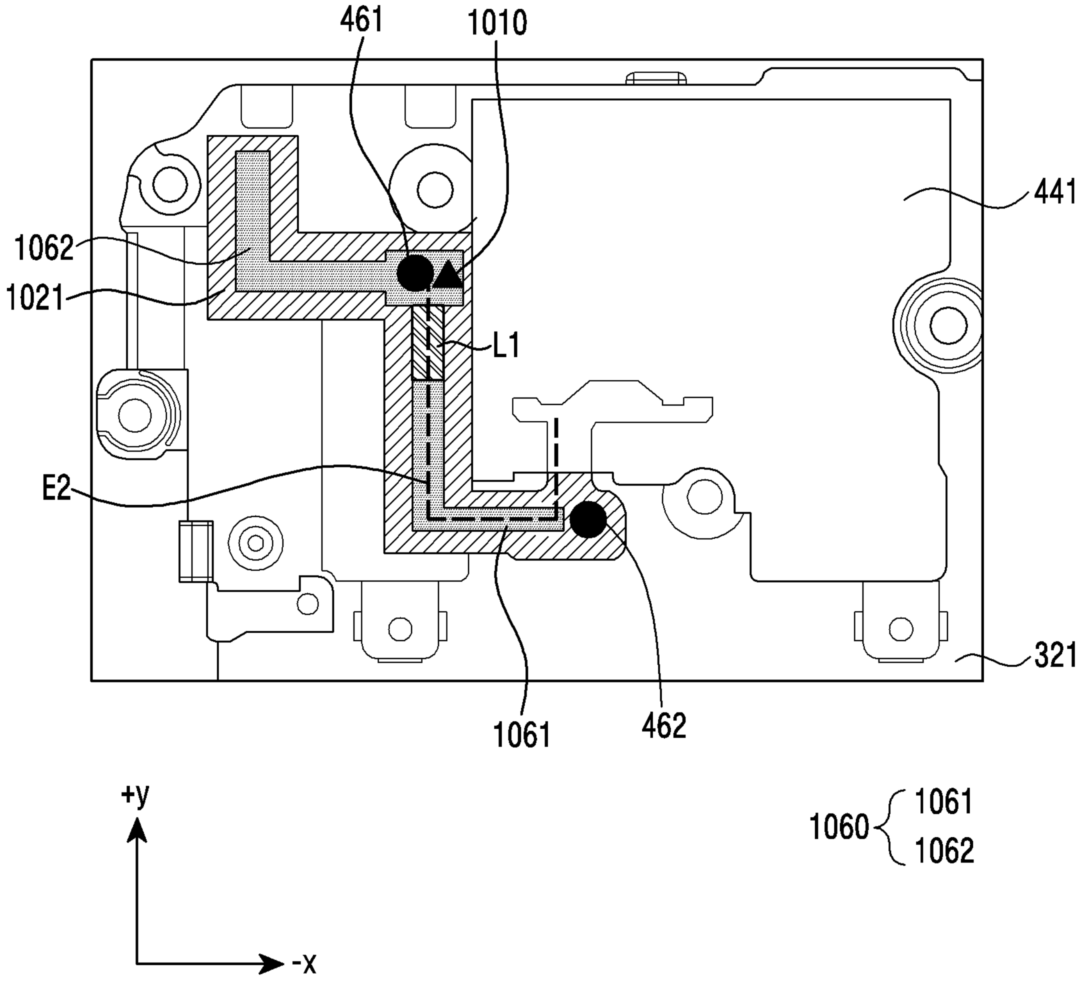
FIG. 10B is a diagram for explaining the structure of arrangement of a first inductor L1, according to an embodiment.

FIG. 10B is a diagram for explaining the structure of arrangement of a first inductor L1, according to an embodiment.

Referring to FIG. 10B, the electronic device 101 of an embodiment may include a first conductive structure 1021, and a first conductive pattern 1060 may be formed in the first conductive structure 1021. (or, the first conductive pattern 1060 may be disposed in the first conductive structure 1021) In an embodiment, the first conductive pattern 1060 may include a first portion 1061 and/or a second portion 1062. For example, the first portion 1061 of the first conductive pattern 1060 may refer to a portion that is connected to the first speaker module 441. For another example, the second portion 1062 of the first conductive pattern 1060 may refer to a portion that is electrically connected to the first conductive connection member 461 and operates as an antenna radiator.

The first inductor L1 of an embodiment may be disposed in the first conductive structure 1021. For example, the first inductor L1 may be disposed between the first portion 1061 and second portion 1062 of the first conductive pattern 1060 and may be included in a second electrical path E2 connecting the first control circuit 520 to the first speaker module 441. The first inductor L1 may have a first inductance (e.g., 100 nH).

Figure 10C:
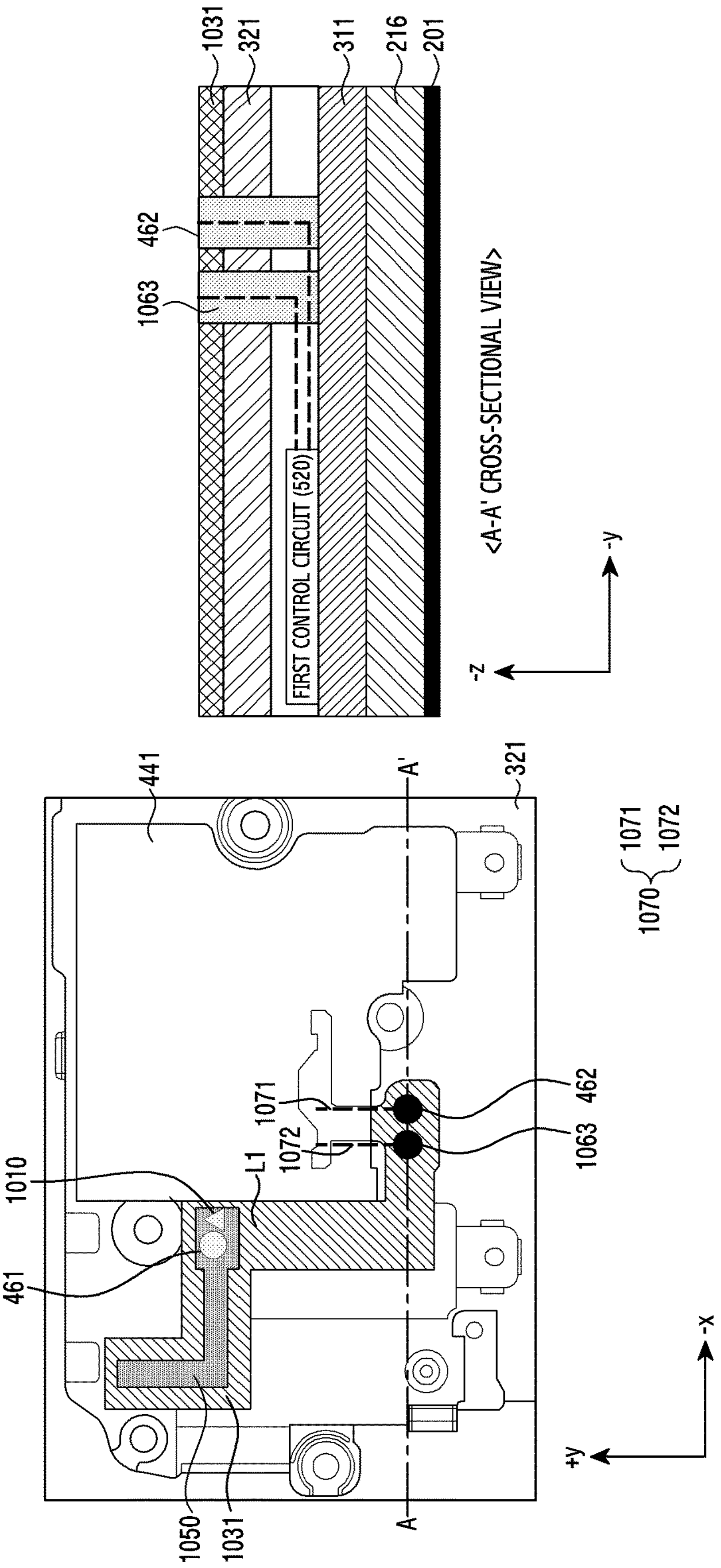
FIG. 10C is a diagram illustrating a first conductive pattern according to an embodiment.

FIG. 10C is a diagram illustrating a first conductive pattern according to an embodiment.

Referring to FIG. 10C, a first conductive structure 1031 of an embodiment may include a conductive pattern 1050. Unlike the first conductive pattern 450 illustrated in FIG. 10A, the conductive pattern 1050 of an embodiment may not be electrically connected to the first speaker module 441.

According to an embodiment, the first speaker module 441 may be electrically connected to the first control circuit 520. For example, the second conductive connection member 462 may be formed to penetrate the first conductive structure 1031 and the first support member 321, and may be electrically connected to the first control circuit 520. Also, the second conductive connection member 462 may be electrically connected to the first speaker module 441 via a first transmission path 1071 formed in the first conductive structure 1031. As a result, the first speaker module 441 may be electrically connected to the first control circuit 520 via the second conductive connection member 462 and the first transmission path 1071.

For another example, a third conductive connection member 1063 may be formed to penetrate the first conductive structure 1031 and the first support member 321, and may be electrically connected to the first control circuit 520. The third conductive connection member 1063 may be electrically connected to the first speaker module 441 via a second transmission path 1072 formed in the first conductive structure 1031. As a result, the first speaker module 441 may be electrically connected to the first control circuit 520 via the third conductive connection member 1063 and the second transmission path 1072. In an embodiment, the first control circuit 520 electrically connected to the first speaker module 441 may transmit a signal for speaker operation to the first speaker module 441, or receive a signal from the first speaker module 441. A signal transmitted and received between the first control circuit 520 and the first speaker module 441 may correspond to a low frequency signal (e.g., DC signal).

According to an embodiment, as the conductive pattern 1050 and the transmission paths 1070 are formed together in the first conductive structure 1031, a manufacturing process of the first conductive structure 1031 may be simplified. For example, when the conductive pattern 1050 and the transmission paths 1070 are formed in separate conductive structures respectively, a manufacturing process may be complicated and a cost consumption may be high, since a first conductive structure in which the conductive pattern 1050 is formed and a second conductive structure in which the transmission paths 1070 are formed must be manufactured separately during the manufacturing process. On the other hand, as the conductive pattern 1050 and transmission paths 1070 of an embodiment are formed in a conductive structure (e.g., the first conductive structure 1031), the manufacturing process may be simplified and a manufacturing cost may be reduced.

Figure 11:
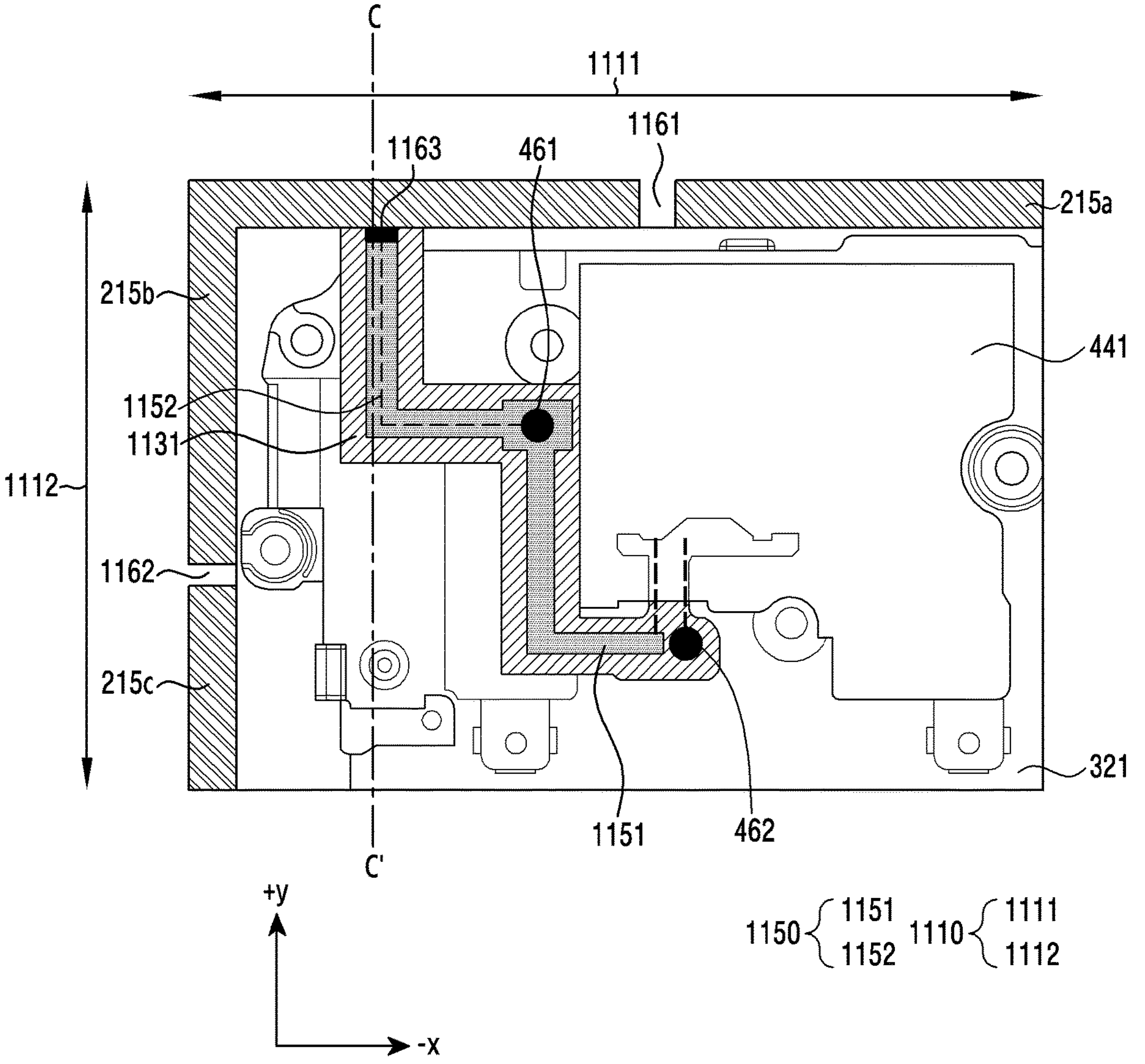
FIG. 11 is a diagram for explaining a method of feeding power to a frame structure by using a first conductive pattern, according to an embodiment.

FIG. 11 is a diagram illustrating a method of feeding power to a frame structure by using a first conductive pattern, according to an embodiment.

Referring to FIG. 11, a frame structure 215 of an embodiment may form at least a portion of an edge 1110 of the electronic device 101. For example, a first frame 215*a* of the frame structure 215 may form a portion of a first edge 1111 of the electronic device 101. For example, a second frame 215*b* of the frame structure 215 may form a portion of the first edge 1111 and a portion of a second edge 1112 perpendicular to the first edge 1111. In an example, a first segment 1161 may be formed between the first frame 215*a* and the second frame 215*b*, and a non-conductive material may be disposed in the first segment 1161. For example, a third frame 215*c* of the frame structure 215 may form a portion of the second edge 1112 of the electronic device 101. In an example, a second segment 1162 may be formed between the second frame 215*b* and the third frame 215*c*, and a non-conductive material may be disposed in the second segment 1162.

According to an embodiment, a conductive pattern 1150 may be electrically connected to the second frame 215*b* through a third conductive connection member 1163 (e.g., a C-clip, a pogo-pin, or a coaxial cable).

Figure 12:
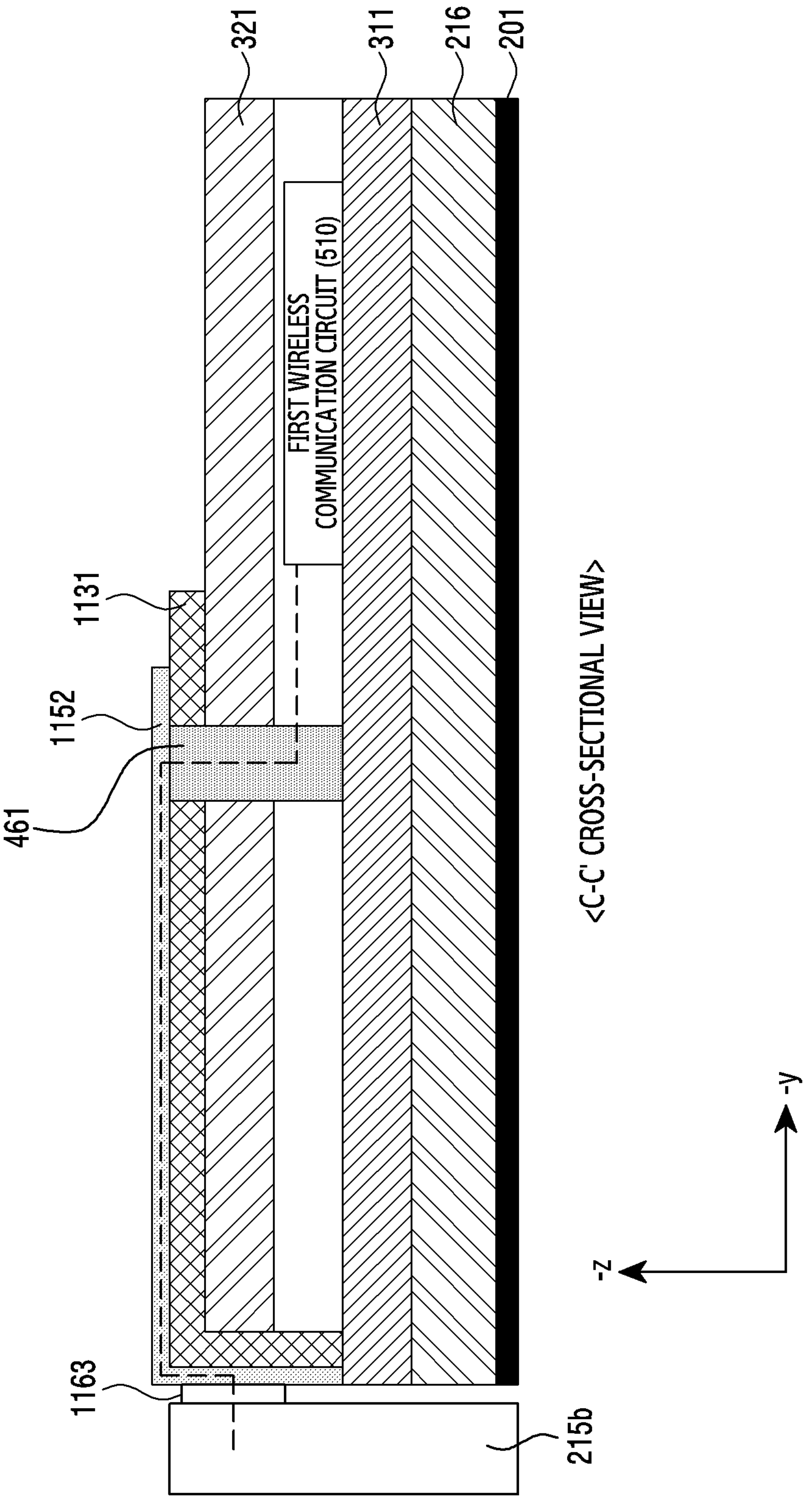
FIG. 12 illustrates a cross-sectional view taken along line C-C' of the embodiment illustrated in FIG. 11, according to an embodiment.

FIG. 12 illustrates a cross-sectional view taken along line C-C' of the embodiment illustrated in FIG. 11, according to an embodiment.

Referring to FIG. 12, the first wireless communication circuit 510 of an embodiment may feed power to the second frame 215*b* and transmit and/or receive a signal in a second frequency band. For example, the first wireless communication circuit 510 may be electrically connected to a second portion 1152 of a conductive pattern 1150 via the first conductive connection member 461. The second portion 1152 of the conductive pattern 1150 may be electrically connected to the second frame 215*b* via the third conductive connection member 1163. As a result, the first wireless communication circuit 510 may be electrically connected to the second frame 215*b* via the first conductive connection member 461, the second portion 1152 of the conductive pattern 1150, and the third conductive connection member 1163, and may feed power to the second frame 215*b* and transmit and/or receive the signal in the second frequency band.

Figure 13:
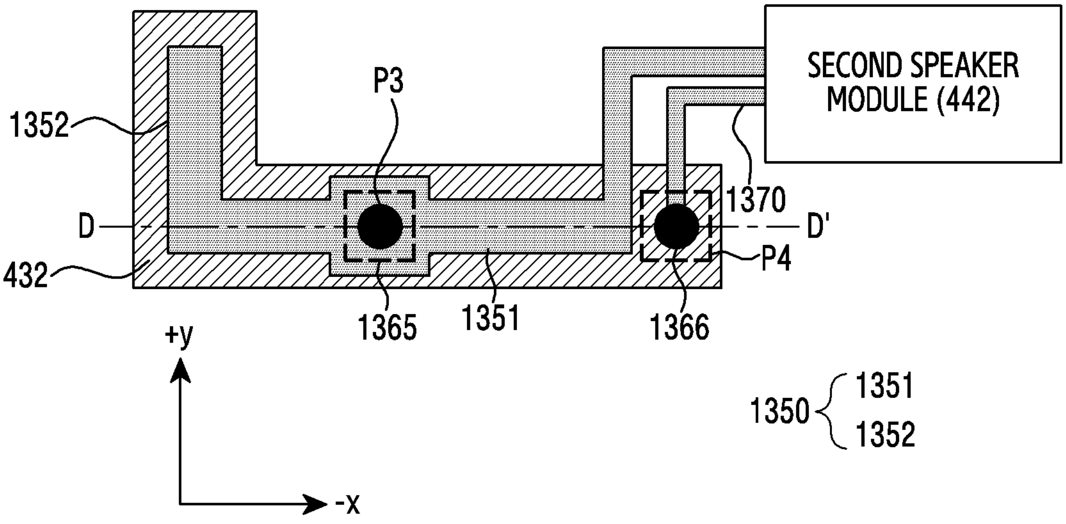
FIG. 13 is a diagram for explaining a second region of a second support member where a second speaker module and a second conductive structure illustrated in FIG. 4A are disposed, according to an embodiment.

FIG. 13 is a diagram for explaining a second region of a second support member where the second speaker module and the second conductive structure illustrated in FIG. 4A are disposed, according to an embodiment.

Referring to FIG. 13, a second conductive pattern 1350 and/or an additional conductive pattern 1370 may be formed in the second conductive structure 432 (e.g., FPCB) of an embodiment. In an embodiment, the second conductive pattern 1350 may be formed of metal (e.g., copper).

According to an embodiment, the second conductive pattern 1350 may include a first portion 1351 extending from a third point P3 and connected to the second speaker module 442, and a second portion 1352 extending from the third point P3. The second portion 1352 of the second conductive pattern 1350 may be used as an antenna radiator.

In an embodiment, the second portion 1352 of the second conductive pattern 1350 used as the antenna radiator may have various shapes. For example, the second portion 1352 may have an L-shape. According to an embodiment, the third point P3 may mean a point where a fifth conductive connection member 1365 is connected to the second conductive pattern 1350.

According to an embodiment, the additional conductive pattern 1370 may extend from a fourth point P4 of the second conductive structure 432 and connect to the second speaker module 442. According to an embodiment, the fourth point P4 may mean a point where a sixth conductive connection member 1366 is connected to the additional conductive pattern 1370.

Figure 14:
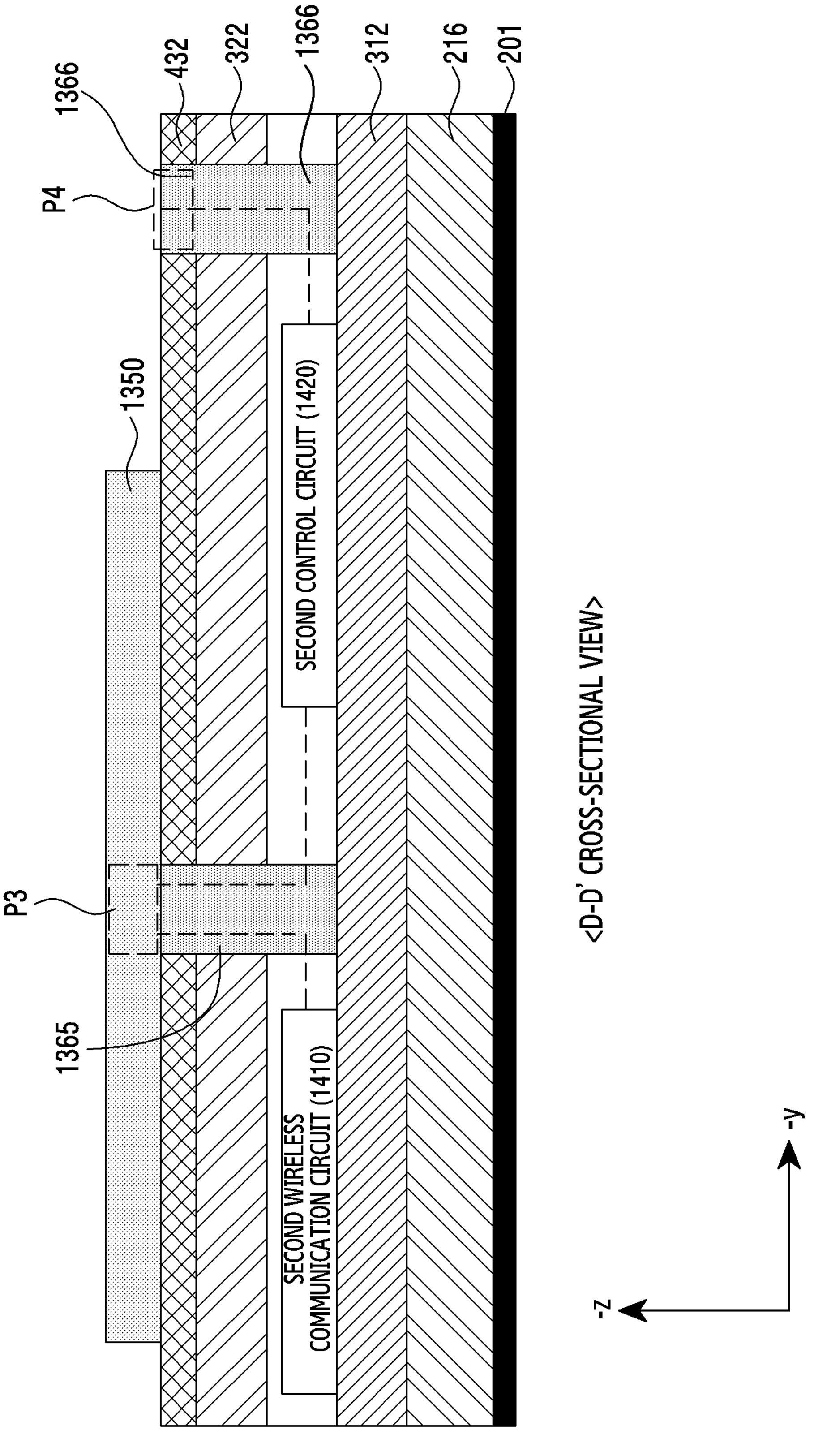
FIG. 14 illustrates a cross-sectional view taken along line D-D' of the second conductive structure illustrated in FIG. 13, according to an embodiment.

FIG. 14 illustrates a cross-sectional view taken along line D-D' of the second conductive structure illustrated in FIG. 13, according to an embodiment.

Referring to FIG. 14, the electronic device 101 of an embodiment may include a second wireless communication circuit 1410, and the second wireless communication circuit 1410 may be disposed on a face of the second printed circuit boards 312. The electronic device 101 may include a second control circuit 1420, and the second control circuit 1420 may be disposed on a face of the second printed circuit board 312. The positions of the second wireless communication circuit 1410 and second control circuit 1420 illustrated in FIG. 14 are only an example for convenience of explanation, and the second wireless communication circuit 1410 and the second control circuit 1420 may be disposed in various positions of the second printed circuit board 312.

According to an embodiment, the second support member 322 may be located in a first direction (e.g., −z direction) with respect to the second printed circuit board 312, and the second conductive structure 432 may be located in a first direction (e.g., −z direction) of the second support member 322.

According to an embodiment, the fifth conductive connection member 1365 may be disposed at a point of the second printed circuit board 312 and may be electrically connected to the second wireless communication circuit 1410 and the second control circuit 1420. The fifth conductive connection member 1365 may be formed (or, disposed) to penetrate the second support member 322 and the second conductive structure 432, and may be electrically connected to the second conductive pattern 1350 at the third point P3. As a result, the second wireless communication circuit 1410 and the second control circuit 1420 may be electrically connected to the third point P3 of the second conductive pattern 1350 via the fifth conductive connection member 1365.

According to an embodiment, the sixth conductive connection member 1366 may be disposed at a point of the second printed circuit board 312 and may be electrically connected to the second control circuit 1420. The sixth conductive connection member 1366 may be formed to penetrate the second support member 322 and the second conductive structure 432, and may be electrically connected to the additional conductive pattern 1370 at the fourth point P4. As a result, the second control circuit 1420 may be electrically connected to the additional conductive pattern 1370 via the sixth conductive connection member 1366.

In the disclosure, the description for the first conductive structure 431, the first conductive pattern 450, the first speaker module 441, the first conductive connection member 461, the second conductive connection member 462, the first wireless communication circuit 510 and/or the first control circuit 520 given with reference to FIG. 1 to FIG. 12 may be sequentially applied to the second conductive structure 432, the second conductive pattern 1350, the second speaker module 442, the fifth conductive connection member 1365, the sixth conductive connection member 1366, the second wireless communication circuit 1410 and/or the second control circuit 1420.

For example, the second wireless communication circuit 1410 may feed power to the second portion 1352 of the second conductive pattern 1350 and transmit and/or receive a first signal in a specified frequency band. In an example, a second capacitor C2 may be disposed or formed in a path through which the second wireless communication circuit 1410 feeds power to the second portion 1352 of the second conductive pattern 1350. For another example, a third inductor L3 may be disposed or formed in the second portion 1352 of the second conductive pattern 1350, and the second control circuit 1420 may transmit a second signal to, and/or receive from, the second speaker module 442 by using the fifth conductive connection member 1365, the third inductor L3, and the second portion 1352 of the second conductive pattern 1350. The second signal may correspond to a low frequency signal (e.g., DC signal).

An electronic device 101 of an embodiment of the disclosure may include a first frame 215*a* forming at least a portion of a first edge 1111 of the electronic device 101, a first speaker module 441 disposed adjacent to the first frame 215*a*, a first wireless communication circuit 510, a first conductive connection member 461 connected to the first wireless communication circuit 510 via a first capacitor C1, a first conductive pattern 450 connected at a first point P1 to the first conductive connection member 461, and including a first portion 451 extending from the first point P1 and connected to the first speaker module 441 and a second portion 452 extending from the first point P1, and a first control circuit 520 electrically connected to the first speaker module 441 through the first conductive connection member 461. The first portion 451 may include a first inductor L1. The second portion 452 of the first conductive pattern 450 may operate as an antenna radiator. The first wireless communication circuit 510 may transmit and/or receive a first signal in a first frequency band by using a first electrical path E1 that includes the first capacitor C1, the first conductive connection member 461, and the second portion 452 of the first conductive pattern 450.

According to an embodiment, the control circuit may apply a second signal to the speaker module by using a second electrical path that includes the conductive connection member, the first portion of the conductive pattern, and the first inductor.

According to an embodiment, the second signal applied to the speaker module through the second electrical path may correspond to a direct current (DC) signal.

The electronic device of an embodiment may further include a second inductor, and the conductive connection member may be connected to the control circuit via the second inductor.

According to an embodiment, a first inductance of the first inductor may have a value between 100 nH and 120 nH.

The electronic device of an embodiment may further include a printed circuit board, and the wireless communication circuit and the control circuit may be disposed on a face of the printed circuit board.

The electronic device of an embodiment may further include a support member disposed in a first direction perpendicular to the a face of the printed circuit board, and the conductive pattern and the speaker module may be disposed in the first direction of the support member.

The electronic device of an embodiment may further include a matching circuit electrically connected to the second portion of the conductive pattern, and the wireless communication circuit may control the matching circuit to perform impedance matching corresponding to the first frequency band.

According to an embodiment, the conductive connection member may correspond to a C-clip, a pogo-pin, or a coaxial cable.

According to an embodiment, the control circuit may include an application processor.

The electronic device of an embodiment may further include a flexible printed circuit board (FPCB), and the conductive pattern may be formed on a face of the FPCB. The conductive pattern may be disposed on a face of the FPCB.

According to an embodiment, an end of the second portion of the conductive pattern may be electrically connected to a conductive portion of the first frame.

According to an embodiment, the wireless communication circuit may feed power to the conductive portion of the first frame through the second portion of the conductive pattern and transmit and/or receive a signal in a second frequency band.

According to an embodiment, the conductive pattern may have an L-shape.

According to an embodiment, the first frequency band may include a frequency band of 5 GHz to 6 GHz.

An electronic device 101 of an embodiment of the disclosure may include a first speaker module 441, a first wireless communication circuit 510, a first conductive connection member 461 connected to the first wireless communication circuit 510 via at least one capacitor (e.g., a first capacitor C1), a first conductive pattern 450 connected at a first point P1 to the first conductive connection member 461, and including a first portion 451 extending from the first point P1 and connected to the first speaker module 441 and a second portion 452 extending from the first point P1, and a first control circuit 520 electrically connected to the first speaker module 441 through the first conductive connection member 461. The first portion 451 may include at least one inductor (e.g., a first inductor L1). The first wireless communication circuit 510 may transmit and/or receive a first signal in a first frequency band by using a first electrical path E1 that includes the at least one capacitor (e.g., the first capacitor C1), the first conductive connection member 461, and the second portion 452 of the first conductive pattern 450. The first control circuit 520 may apply a second signal to the first speaker module 441 by using a second electrical path E2 that includes the first conductive connection member 461, the first portion 451 of the first conductive pattern 450, and the at least one inductor (e.g., the first inductor L1).

According to an embodiment, the second signal applied to the speaker module through the second electrical path may correspond to a direct current (DC) signal.

According to an embodiment, the second portion of the conductive pattern may have an L-shape.

The electronic device of an embodiment may further include a flexible printed circuit board (FPCB), and the conductive pattern may be formed on a face of the FPCB.

The electronic device of an embodiment may further include a matching circuit electrically connected to the second portion of the conductive pattern, and the wireless communication circuit may control the matching circuit to perform impedance matching corresponding to the first frequency band.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

What is claimed is:

1. An electronic device comprising:

a first frame forming at least a portion of a first edge of the electronic device;

a speaker module disposed adjacent to the first frame;

a wireless communication circuit;

a first capacitor;

a conductive connection member connected to the wireless communication circuit via the first capacitor;

a conductive pattern connected to the conductive connection member at a first point, wherein the conductive pattern comprises:

a first portion extending from the first point and connected to the speaker module, wherein the first portion comprises a first inductor; and a second portion extending from the first point, wherein the second portion of the conductive pattern is configured to operate as an antenna radiator; and a control circuit electrically connected to the speaker module through the conductive connection member, wherein the wireless communication circuit is configured to transmit or receive a first signal in a first frequency band via a first electrical path comprising the first capacitor, the conductive connection member, and the second portion of the conductive pattern.

2. The electronic device of claim 1, wherein the control circuit is configured to apply a second signal to the speaker module via a second electrical path comprising the conductive connection member and the first portion of the conductive pattern.

3. The electronic device of claim 2, wherein the second signal corresponds to a direct current (DC) signal.

4. The electronic device of claim 1, further comprising a second inductor, wherein the conductive connection member is connected to the control circuit via the second inductor.

5. The electronic device of claim 1, wherein a first inductance of the first inductor has a value in a range of 100 nH and 120 nH.

6. The electronic device of claim 1, further comprising a printed circuit board, wherein the wireless communication circuit and the control circuit are disposed on a face of the printed circuit board.

7. The electronic device of claim 6, further comprising a support member disposed in a first direction perpendicular to the face of the printed circuit board, wherein the conductive pattern and the speaker module are disposed in the first direction of the support member.

8. The electronic device of claim 1, further comprising a matching circuit connected to the second portion of the conductive pattern, wherein the wireless communication circuit is further configured to control the matching circuit to perform impedance matching corresponding to the first frequency band.

9. The electronic device of claim 1, wherein the conductive connection member comprises a C-clip, a pogo-pin, or a coaxial cable.

10. The electronic device of claim 1, wherein the control circuit comprises an application processor.

11. The electronic device of claim 1, further comprising a flexible printed circuit board, wherein the conductive pattern is disposed on a face of the flexible printed circuit board.

12. The electronic device of claim 1, wherein an end of the second portion of the conductive pattern is connected to a conductive portion of the first frame.

13. The electronic device of claim 12, wherein the wireless communication circuit is further configured to feed power to the conductive portion of the first frame through the second portion of the conductive pattern and to transmit or receive a signal in a second frequency band.

14. The electronic device of claim 1, wherein the conductive pattern has an L-shape.

15. The electronic device of claim 1, wherein the first frequency band comprises a frequency band of 5 GHz to 6 GHz.

16. An electronic device comprising:

a speaker circuit;

a wireless communication circuit;

a conductive connection member connected to the wireless communication circuit via at least one capacitor;

a conductive pattern connected to the conductive connection member at a first point, wherein the conductive pattern includes:

a first portion extending from the first point and connected to the speaker circuit, wherein the first portion includes at least one inductor, and a second portion extending from the first point; and a control circuit electrically connected to the speaker circuit via the conductive connection member, wherein the wireless communication circuit is configured to transmit and/or receive a first signal of a first frequency band using a first electrical path including the at least one capacitor, the conductive connection member, and the second portion of the conductive pattern, and wherein the control circuit is configured to apply a second signal to the speaker circuit using a second electrical path including the conductive connection member, the first portion of the conductive pattern, and the at least one inductor.

17. The electronic device of claim 16, wherein the second signal corresponds to a direct current (DC) signal.

18. The electronic device of claim 16, wherein the second portion of the conductive pattern has a L-shape.

19. The electronic device of claim 16, further comprising:

a flexible printed circuit board (FPCB), wherein the conductive pattern is disposed on a face of the FPCB.

20. The electronic device of claim 16, further comprising:

a matching circuit electrically connected to the second portion of the conductive pattern, wherein the wireless communication circuit is configured to control the matching circuit to perform an impedance matching corresponding to the first frequency band.

* * * * *